United States Patent
Garg et al.

(10) Patent No.: US 12,118,697 B2
(45) Date of Patent: Oct. 15, 2024

(54) MERGING SPLIT-PIXEL DATA FOR DEEPER DEPTH OF FIELD

(71) Applicant: Google LLC, Mountain View, CA (US)

(72) Inventors: Rahul Garg, Sunnyvale, CA (US); Neal Wadhwa, Cambridge, MA (US)

(73) Assignee: Google LLC, Mountain View, CA (US)

( * ) Notice: Subject to any disclaimer, the term of this patent is extended or adjusted under 35 U.S.C. 154(b) by 500 days.

(21) Appl. No.: 17/753,279

(22) PCT Filed: Feb. 24, 2021

(86) PCT No.: PCT/US2021/019390
§ 371 (c)(1),
(2) Date: Feb. 25, 2022

(87) PCT Pub. No.: WO2022/182340
PCT Pub. Date: Sep. 1, 2022

(65) Prior Publication Data
US 2023/0153960 A1 May 18, 2023

(51) Int. Cl.
*G06T 5/73* (2024.01)
*G06T 5/50* (2006.01)
*H04N 25/704* (2023.01)

(52) U.S. Cl.
CPC .............. *G06T 5/73* (2024.01); *G06T 5/50* (2013.01); *H04N 25/704* (2023.01)

(58) Field of Classification Search
CPC .............. H04N 23/672; H04N 23/675; H04N 25/704; H04N 23/84; G06T 5/73; G06T 5/50
See application file for complete search history.

(56) References Cited

U.S. PATENT DOCUMENTS

| 10,239,606 B2 | 3/2019 | Guida |
| 2019/0109996 A1 | 4/2019 | Kanda et al. |

FOREIGN PATENT DOCUMENTS

| JP | 2015110416 | 6/2015 |
| JP | 2019071596 | 5/2019 |
| JP | 2019129374 | 8/2019 |

OTHER PUBLICATIONS

Learning Single Camera Depth Estimation using Dual-Pixels, IEEE (Year: 2019).*

(Continued)

*Primary Examiner* — Nicholas G Giles
(74) *Attorney, Agent, or Firm* — McDonnell Boehnen Hulbert & Berghoff LLP

(57) ABSTRACT

A method includes obtaining split-pixel image data including a first sub-image and a second sub-image. The method also includes determining, for each respective pixel of the split-pixel image data, a corresponding position of a scene feature represented by the respective pixel relative to a depth of field, and identifying, based on the corresponding positions, out-of-focus pixels. The method additionally includes determining, for each respective out-of-focus pixel, a corresponding pixel value based on the corresponding position, a location of the respective out-of-focus pixel within the split-pixel image data, and at least one of: a first value of a corresponding first pixel in the first sub-image or a second value of a corresponding second pixel in the second sub-image. The method further includes generating, based on the corresponding pixel values, an enhanced image having an extended depth of field.

20 Claims, 12 Drawing Sheets

(56) References Cited

OTHER PUBLICATIONS

Abuolaim et al., "Defocus deblurring using dual-pixel data," European Conference on Computer Vision, arXiv:2005.00305v3, Jul. 16, 2020, 27 pages.

Garg et al., U.S. Appl. No. 17/626,069, filed Jan. 10, 2022.

International Searching Authority, International Search Report and Written mailed on Nov. 22, 2021, issued in connection with International Patent Application No. PCT/US2021/019390 filed on Feb. 24, 2021, 14 pages.

Kuthirummal et al., "Flexible Depth of Field Photography," IEEE Transactions on Pattern Analysis and Machine Intelligence, Jan. 2011, pp. 58-71, vol. 33, No. 1.

Nagahara et al., "Flexible Depth of Field Photography," Computer Vision, Lecture Notes in Computer Science, ECCV 2008, 15 pages, vol. 5305.

Wadhwa et al., "Synthetic Depth-of-Field with a Single-Camera Mobile Phone," ACM Transactions on Graphics, 2018, 18 pages, vol. 37, No. 4, Article 64.

Japanese Patent Office, Office Action mailed on Sep. 19, 2023, issued in connection with Japanese Patent Application No. 2022528667, 3 pages.

\* cited by examiner

| SCENE DEPTH | PIXEL POSITION | HIGH FREQUENCY PIXEL SOURCE |
|---|---|---|
| 0 | 1ST HALF | 1ST OR 2ND DP SUB-IMAGE |
| 0 | 2ND HALF | 1ST OR 2ND DP SUB-IMAGE |
| -1 | 1ST HALF | 1ST DP SUB-IMAGE |
| -1 | 2ND HALF | 2ND DP SUB-IMAGE |
| +1 | 1ST HALF | 2ND DP SUB-IMAGE |
| +1 | 2ND HALF | 1ST DP SUB-IMAGE |

| SCENE DEPTH | PIXEL POSITION | HIGH FREQUENCY PIXEL SOURCE |
|---|---|---|
| 0 | 1ST QUADRANT | 1ST OR 2ND OR 3RD OR 4TH DP SUB-IMAGE |
| | 2ND QUADRANT | 1ST OR 2ND OR 3RD OR 4TH DP SUB-IMAGE |
| | 1ST QUADRANT | 1ST OR 2ND OR 3RD OR 4TH DP SUB-IMAGE |
| | 2ND QUADRANT | 1ST OR 2ND OR 3RD OR 4TH DP SUB-IMAGE |
| -1 | 1ST QUADRANT | 1ST DP SUB-IMAGE |
| | 2ND QUADRANT | 2ND DP SUB-IMAGE |
| | 3RD QUADRANT | 3RD DP SUB-IMAGE |
| | 4TH QUADRANT | 4TH DP SUB-IMAGE |
| +1 | 1ST QUADRANT | 4TH DP SUB-IMAGE |
| | 2ND QUADRANT | 3RD DP SUB-IMAGE |
| | 3RD QUADRANT | 2ND DP SUB-IMAGE |
| | 4TH QUADRANT | 1ST DP SUB-IMAGE |

MERGING SPLIT-PIXEL DATA FOR DEEPER DEPTH OF FIELD

CROSS-REFERENCE TO RELATED APPLICATIONS

The present application is a National Stage Application under 35 U.S.C. § 371 and claims priority to International Patent Application No. PCT/US2021/019390, filed Feb. 24, 2021, and titled "Merging Split-Pixel Data For Deeper Depth of Field," which is incorporated herein by reference in its entirety.

BACKGROUND

A portion of an image may be blurred due to a corresponding portion of a scene being positioned outside of a depth of field of a camera device capturing the image. The extent of blurring may depend on the position of the corresponding portion of the scene relative to the depth of field, with the amount of blurring increasing as the corresponding portion of the scene moves farther away from the depth of field in either a direction towards the camera or a direction away from the camera. In some cases, image blurring is undesirable, and may be adjusted or corrected using various image processing techniques, models, and/or algorithms.

SUMMARY

A split-pixel camera may be configured to generate split-pixel image data that includes a plurality of sub-images. For out-of-focus pixels of the split-pixel image data, the frequency content of the sub-images may vary as a function of (i) location of the out-of-focus pixel within the image data and (ii) position of the scene feature represented by the out-of-focus pixel relative to a depth of field of the split-pixel camera (i.e., pixel depth). Specifically, for a given out-of-focus pixel, one of the sub-images may appear sharper than other sub-images, depending on the location and depth associated with the given out-of-focus pixel. Accordingly, the relationship between pixel location, pixel depth, and sub-image frequency content may be characterized for the split-pixel camera, and used to improve the sharpness of portions of the split-pixel image data. In particular, rather than summing, or equally weighting, pixels of the sub-images, sub-image pixels containing both low and high frequency content may be given greater weight than sub-image pixels containing only low frequency content, thereby increasing the apparent sharpness of the resulting image.

In a first example embodiment, a method may include obtaining split-pixel image data captured by a split-pixel camera. The split-pixel image data may include a first sub-image and a second sub-image. The method may also include determining, for each respective pixel of a plurality of pixels of the split-pixel image data, a corresponding position of a scene feature represented by the respective pixel relative to a depth of field of the split-pixel camera. The method may additionally include identifying, based on the corresponding position of the scene feature represented by each respective pixel of the plurality of pixels, one or more out-of-focus pixels of the plurality of pixels, where the one or more out-of-focus pixels are positioned outside of the depth of field. The method may further include determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image. The method may yet further include generating, based on the corresponding pixel value determined for each respective out-of-focus pixel, an enhanced image having an extended depth of field.

In a second example embodiment, a system may include a processor and a non-transitory computer-readable medium having stored thereon instructions that, when executed by the processor, cause the processor to perform operations. The operations may include obtaining split-pixel image data captured by a split-pixel camera. The split-pixel image data may include a first sub-image and a second sub-image. The operations may also include determining, for each respective pixel of a plurality of pixels of the split-pixel image data, a corresponding position of a scene feature represented by the respective pixel relative to a depth of field of the split-pixel camera. The operations may additionally include identifying, based on the corresponding position of the scene feature represented by each respective pixel of the plurality of pixels, one or more out-of-focus pixels of the plurality of pixels, where the one or more out-of-focus pixels are positioned outside of the depth of field. The operations may further include determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image. The operations may yet further include generating, based on the corresponding pixel value determined for each respective out-of-focus pixel, an enhanced image having an extended depth of field.

In a third example embodiment, a non-transitory computer-readable medium may have stored thereon instructions that, when executed by a computing device, cause the computing device to perform operations. The operations may include obtaining split-pixel image data captured by a split-pixel camera. The split-pixel image data may include a first sub-image and a second sub-image. The operations may also include determining, for each respective pixel of a plurality of pixels of the split-pixel image data, a corresponding position of a scene feature represented by the respective pixel relative to a depth of field of the split-pixel camera. The operations may additionally include identifying, based on the corresponding position of the scene feature represented by each respective pixel of the plurality of pixels, one or more out-of-focus pixels of the plurality of pixels, where the one or more out-of-focus pixels are positioned outside of the depth of field. The operations may further include determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image. The operations may yet further include generating, based on the corresponding pixel value determined for each respective out-of-focus pixel, an enhanced image having an extended depth of field.

In a fourth example embodiment, a system may include means for obtaining split-pixel image data captured by a split-pixel camera. The split-pixel image data may include a first sub-image and a second sub-image. The system may also include means for determining, for each respective pixel of a plurality of pixels of the split-pixel image data, a corresponding position of a scene feature represented by the respective pixel relative to a depth of field of the split-pixel camera. The system may additionally include means for identifying, based on the corresponding position of the scene feature represented by each respective pixel of the plurality of pixels, one or more out-of-focus pixels of the plurality of pixels, where the one or more out-of-focus pixels are positioned outside of the depth of field. The system may further include means for determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image. The system may yet further include means for generating, based on the corresponding pixel value determined for each respective out-of-focus pixel, an enhanced image having an extended depth of field.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6G is a table that summarizes the relationships shown in FIGS. 6A, 6B, 6C, 6D, 6E, and 6F, in accordance with examples described herein.

FIG. 7G is a table that summarizes the relationships shown in FIGS. 7A, 7B, 7C, 7D, 7E, and 7F, in accordance with examples described herein.

DETAILED DESCRIPTION

Figure 1:
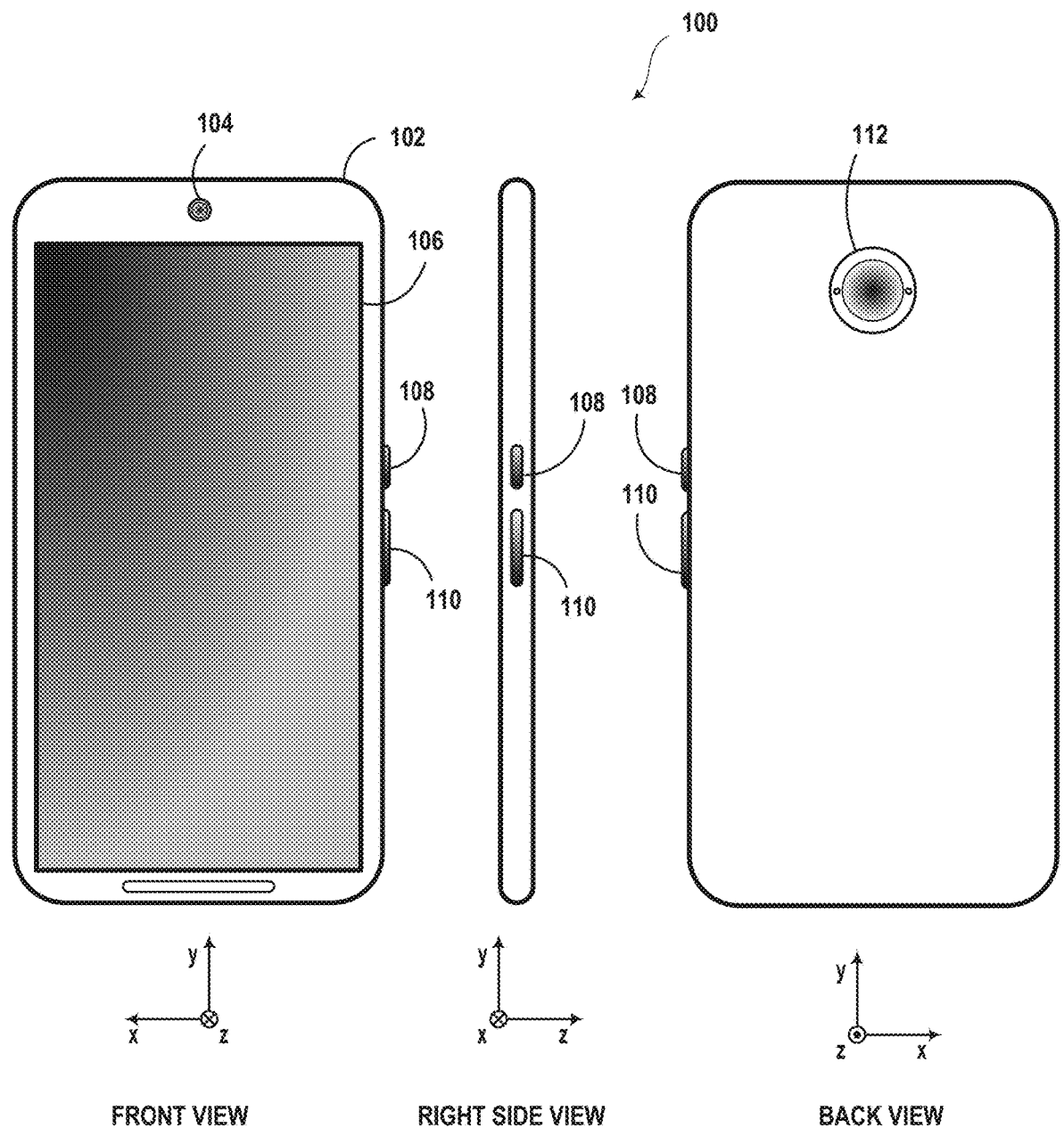
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A split-pixel camera may be used to generate split-pixel image data that includes two or more sub-images, each generated by a corresponding subset of photosites of the split-pixel camera. For example, the split-pixel camera may include a dual-pixel image sensor with each pixel thereof made up of two photosites. Accordingly, the split-pixel image data may be dual-pixel image data that includes a first sub-image generated by left photosites of the pixels and a second sub-image generated by right photosites of the pixels. In another example, the split-pixel camera may include a quad-pixel image sensor with each pixel thereof made up of four photosites. Accordingly, the split-pixel image data may be quad-pixel image data that includes a first sub-image generated by top left photosites of the pixels, a second sub-image generated by top right photosites of the pixels, a third sub-image generated by bottom left photosites of the pixels, and a fourth sub-image generated by bottom right photosites of the pixels.

When a split-pixel camera is used to capture an image of a scene feature (e.g., an object or portion thereof) that is out-of-focus (i.e., positioned outside of a depth of field of the split-pixel camera), the frequency content of the sub-images may differ. Specifically, for each out-of-focus pixel, at least one split-pixel sub-image of the split-pixel image data, referred to as a high frequency pixel source, may represent spatial frequencies above a threshold frequency that are not represented by other split-pixel sub-images of the split-pixel image data, referred to as low frequency pixel source(s). The difference in the frequency content of the sub-images may be a function of (i) a position of the scene feature (e.g., the object or portion thereof) relative to the depth of field (and thus a position, relative to a depth of focus of the camera, of an image representing the scene feature) and (ii) a location (e.g., as represented by coordinates within the image), with respect to an area of the image sensor, of the out-of-focus pixel(s) representing the scene feature.

When these two sub-images are summed to generate the split-pixel image, some of the sharpness of the high frequency pixel source may be lost due to the spatial frequencies above the threshold frequency being represented in only one of the sub-images. Accordingly, the sharpness of the overall split-pixel image resulting from combining the sub-images may be enhanced by weighting the high frequency pixel source more heavily than the low frequency pixel source (rather than merely summing the sub-images), resulting in a boosting of the spatial frequencies above the threshold frequency.

In some cases, the high frequency pixel source and the low frequency pixel source may be merged in image space. In one example, each out-of-focus pixel may be a weighted sum of the spatially-corresponding pixels in the sub-images, with greater weight being given to the spatially-corresponding high frequency pixel source than the spatially-corresponding low frequency pixel source. In another example, a corresponding source pixel may be selected for each out-of-focus pixel from among the spatially-corresponding pixels of the sub-images. Specifically, the spatially-corresponding high frequency pixel source may be selected as the source pixel, and the spatially-corresponding low frequency pixel source may be discarded.

In other cases, the high frequency pixel source and the low frequency pixel source may be merged in frequency space. Specifically, the high frequency pixel source and the low frequency pixel source may each be assigned frequency-specific weights. For example, for frequencies above a threshold frequency, frequencies that are present in the high frequency pixel source, but absent from or underrepresented in the low frequency pixel source, may be boosted to increase the sharpness of the resulting enhanced image. Frequencies below the threshold frequency, and/or frequencies that are present in both the high frequency pixel source and the low frequency pixel source may be weighted equally, thus preserving the content of both sub-images at these frequencies.

The difference in the frequency content of the sub-images may be the result of optical imperfections present in the optical path of the split-pixel camera device. Thus, in some cases, the relationship between frequency content, pixel depth, and pixel location may be determined on a per-camera basis and/or a per-camera-model basis, and may subsequently be used in connection with the corresponding camera instance and/or camera model to enhance the sharpness of split-pixel images captured thereby.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112, one or more of which may be configured to generate dual-pixel image data.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
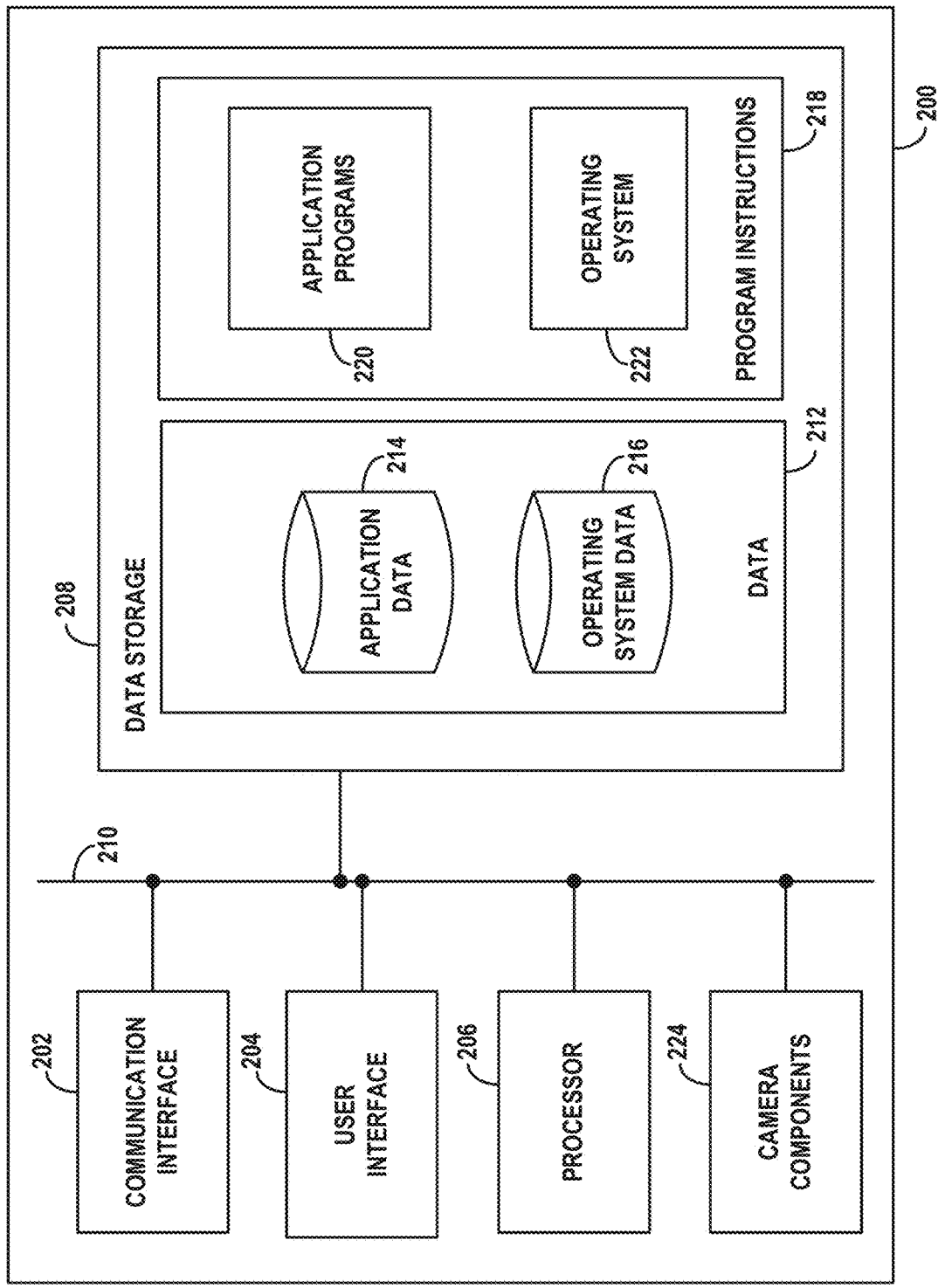
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. EXAMPLE DUAL-PIXEL IMAGE SENSOR

Figure 3:
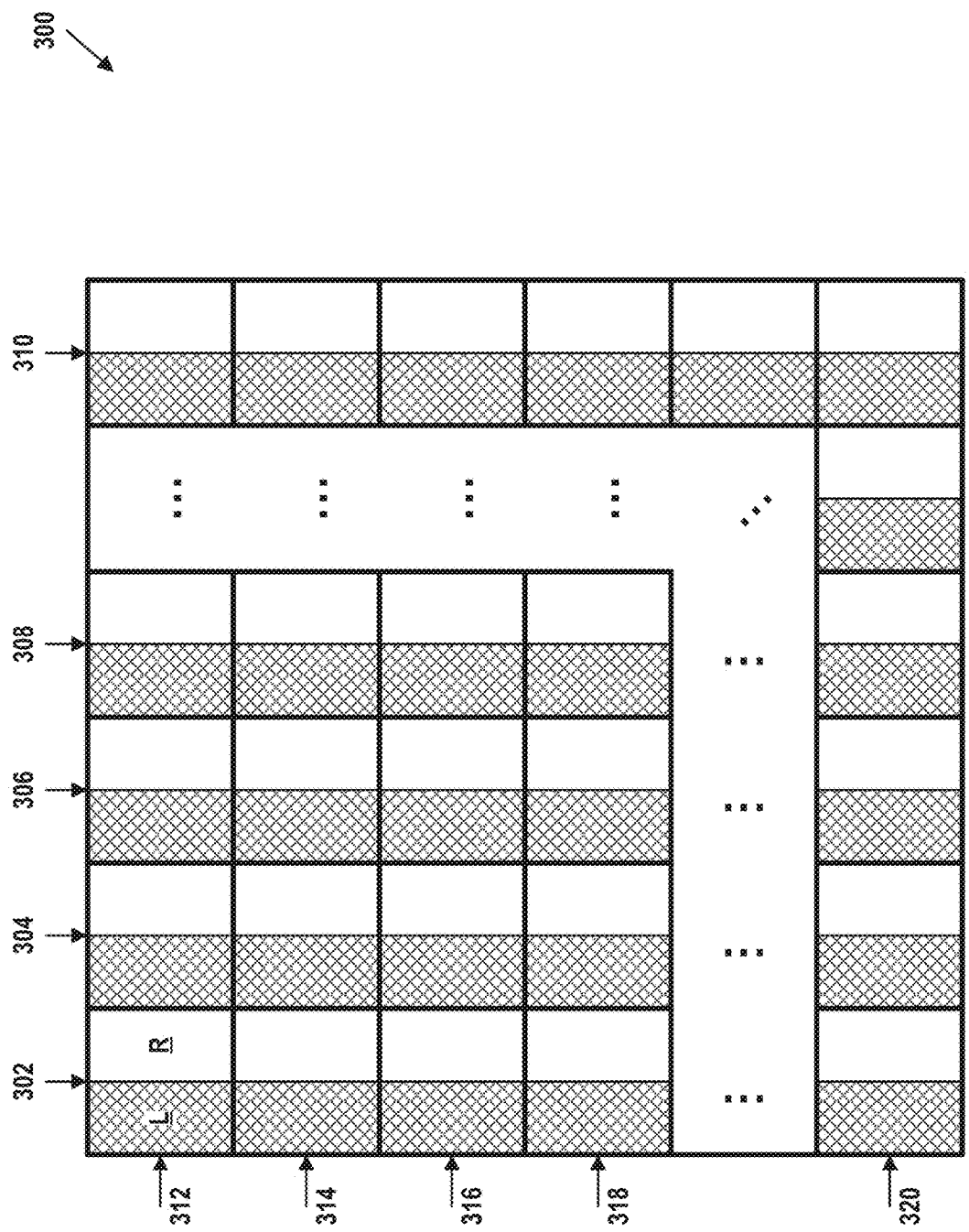
FIG. 3 illustrates a dual-pixel image sensor, in accordance with examples described herein.

FIG. 3 illustrates a split-pixel image sensor 300 that is configured to generate split-pixel image data. Specifically, split-pixel image sensor 300 is shown as a dual-pixel image sensor that includes a plurality of pixels arranged in a grid that includes columns 302, 304, 306, and 308 through 310 (i.e., columns 302-310) and rows 312, 314, 316, and 318 through 320 (i.e., rows 312-320). Each pixel is shown divided into a first (e.g., left) photosite, indicated with a corresponding hatched region, and a second (e.g., right) photosite, indicated with a corresponding white-filled region. Thus, the right half of the pixel located at column 302, row 312 is labeled "R" to indicate the right photosite, and the left half of the pixel is labeled "L" to indicate the left photosite.

Although the photosites of each pixel are shown dividing each pixel into two equal vertical halves, the photosites may alternatively divide each pixel in other ways. For example, each pixel may be divided into a top photosite and a bottom photosite. The areas of the photosites might not be equal. Further, while split-pixel image sensor 300 is shown as a dual-pixel image sensor that includes two photosites per pixel, split-pixel image sensor 300 may alternatively be implemented with each pixel divided into a different number of photosites. For example, split-pixel image sensor 300 may be implemented as a quad-pixel image sensor with each respective pixel thereof divided into four photosites that define four quadrants of the respective pixel (e.g., a (first) top left quadrant, a (second) top right quadrant, a (third) bottom left quadrant, and a (fourth) bottom right quadrant).

Each photosite of a given pixel may include a corresponding photodiode, the output signal of which may be read independently of other photodiodes. Additionally, each pixel of split-pixel image sensor 300 may be associated with a corresponding color filter (e.g., red, green, or blue). A demosaicing algorithm may be applied to the output of split-pixel image sensor 300 to generate a color image. In some cases, fewer than all of the pixels of split-pixel image sensor 300 may be divided into multiple photosites. For example, each pixel associated with a green color filter may be divided into two independent photosites, while each pixel associated with a red or blue color filter may include a single photosite. In some cases split-pixel image sensor 300 may be used to implement front-facing camera 104 and/or rear-facing camera 112, and may form part of camera components 224.

Split-pixel image sensor 300 may be configured to generate split-pixel image data. In one example, the split-pixel image data may be dual-pixel image data that includes a first sub-image generated by a first set of photosites (e.g., left photosites only) and a second sub-image generated by a second set of photosites (e.g., right photosites only). In another example, the split-pixel image data may be quad-pixel image data that includes a first sub-image generated by a first set of photosites (e.g., top left photosites only), a second sub-image generated by a second set of photosites (e.g., top right photosites only), a third sub-image generated by a third set of photosites (e.g., bottom left photosites only), and a fourth sub-image generated by a fourth set of photosites (e.g., bottom right photosites only).

The sub-images may be generated as part of a single exposure. For example, the sub-images may be captured substantially simultaneously, with a capture time of one sub-image being within a threshold time of a capture time of another sub-image. The signals generated by each photosite of a given pixel may be combined into a single output signal, thereby generating conventional (e.g., RGB) image data.

When a scene feature, such as a foreground object, a background object, an environment, and/or portion(s) thereof, being imaged is in-focus (i.e., the scene feature is within a depth of field of the camera, and/or light reflected therefrom is focused within a depth of focus of the camera), the respective signal generated by each photosite of a given pixel may be substantially the same (e.g., the signals of a split-pixel may be within a threshold of one another). When the scene feature being imaged is out-of-focus (i.e., the scene feature is in front of or behind the depth of field of the camera, and/or the light reflected therefrom is focused in front of or behind the depth of focus of the camera), the respective signal generated by a first photosite of a given pixel may differ from the respective signal(s) generated by the other photosite(s) of the given pixel. The extent of this difference may be proportional to an extent of defocus, and may indicate the position of the scene feature relative to the depth of field (and the position at which light reflected therefrom is focused relative to the depth of focus). Accordingly, split-pixel image data may be used to determine whether a scene feature being photographed is within, in front of, and/or behind a depth of field of the camera device.

IV. EXAMPLE POINT SPREAD FUNCTIONS OF SPLIT-PIXEL IMAGE DATA

Figure 4:
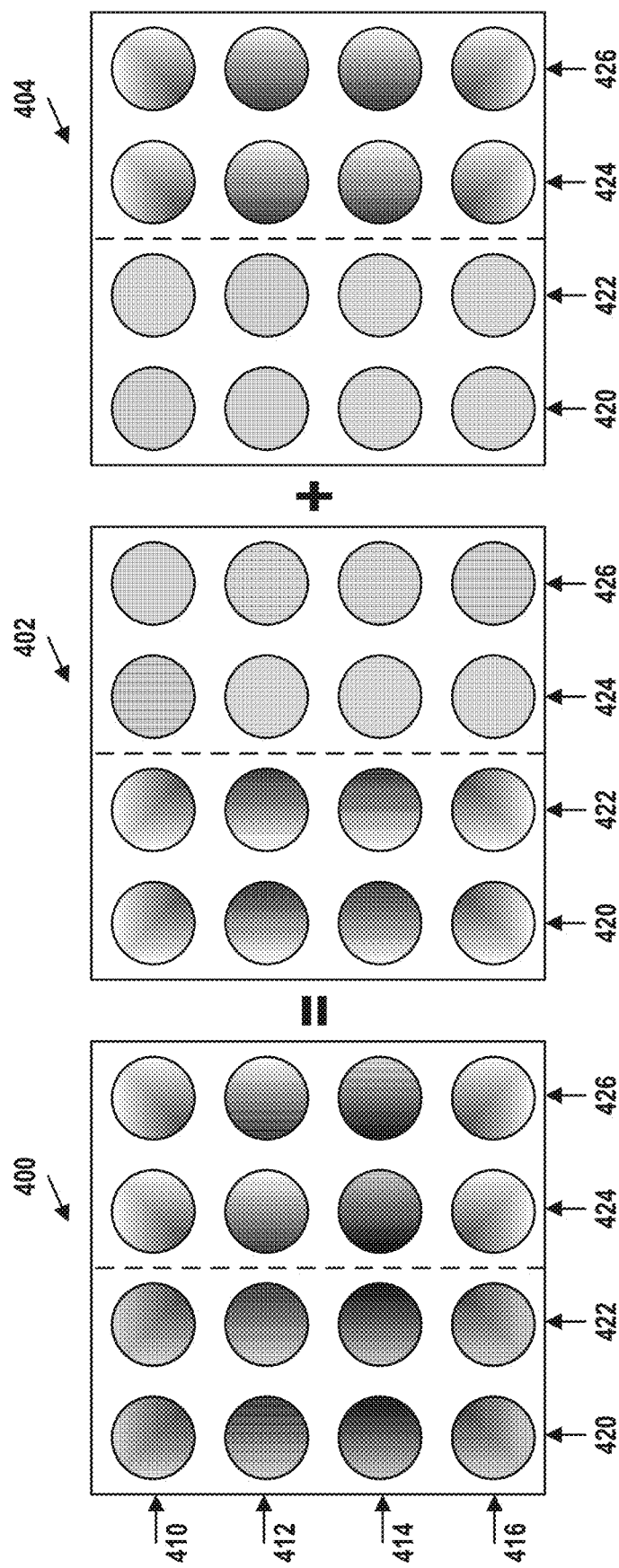
FIG. 4 illustrates point spread functions associated with split-pixel image data, in accordance with examples described herein.

FIG. 4 illustrates an example spatial variation of point spread functions (PSFs) of a dual-pixel image sensor (e.g., split-pixel image sensor 300) associated with imaging an out-of-focus plane. Specifically, FIG. 4 shows regions 400, 402, and 404, each corresponding to an area of the dual-pixel image sensor. PSFs in region 402 show the spatial variation of PSFs associated with a left sub-image, PSFs in region 404 shows the spatial variation of PSFs associated with a right sub-image, and PSFs in region 400 represents the spatial variation of PSFs associated with the overall dual-pixel image, each while imaging the out-of-focus plane. As indicated in FIG. 4, the PSFs of the overall dual-pixel image are equal to a sum of the PSFs of the left sub-image and the right sub-image. The size scale of the PSFs in relation to the size of the dual-pixel image sensor was chosen for clarity of illustration, and may be different in various implementations.

Each respective region of regions 400, 402, and 404 includes sixteen PSFs arranged into rows 410, 412, 414, and 416 and columns 420, 422, 424, and 426. Additionally, a corresponding dashed line shows a vertical midline of each respective region, and thus divides the respective region into two equal halves: a left half and a right half. The left half of region 402 includes PSFs that allow for capture of a greater extent of spatial high-frequency information than PSFs of the right half of region 402, as indicated by the differences in the shading pattern of these PSFs. Specifically, the PSFs in columns 420 and 422 of region 402 have a higher cut-off spatial frequency than the PSFs in columns 424 and 426 of region 402. Similarly, the right half of region 404 includes PSFs that allow for capture of a greater extent of spatial high-frequency information than PSFs of the left half of region 404, as indicated by the differences in the shading pattern of these PSFs. Specifically, the PSFs in columns 424 and 426 of region 404 have a higher cut-off spatial frequency than the PSFs in columns 420 and 422 of region 404.

Accordingly, when imaging an out-of-focus region of a scene, the left half of the first sub-image corresponding to region 402 may appear sharper than (i) the right half of the first sub-image and (ii) the left half of the second sub-image corresponding to region 404. Similarly, when imaging the out-of-focus region of the scene, the right half of the second sub-image corresponding to region 404 appears sharper than (i) the left half of the second sub-image and (ii) the right half of the first sub-image corresponding to region 402.

This spatial variability of frequency content across split-pixel sub-images may be a result of various real-world imperfections in the optical path of the dual-pixel camera device, and might not be apparent from idealized optics models. In some cases, the spatial variability may be empirically characterized on a per-camera-model basis, and subsequently used to generate enhanced versions of images captured by that camera model.

When the first sub-image and the second sub-image are added, the resulting overall dual-pixel image corresponds to region 400. That is, the resulting dual-pixel image appears to have been generated using a dual-pixel image sensor associated with the PSFs of region 400. Accordingly, the relatively sharper content of the left half of the first sub-image (corresponding to region 402) is combined with, and thus blurred by, the content of the left half of the second sub-image (corresponding to region 404). Similarly, the relatively sharper content of the right half of the second sub-image (corresponding to region 404) is combined with, and thus blurred by, the content of the right half of the first sub-image (corresponding to region 402).

Specifically, frequencies up to a first cut-off frequency of the PSFs in the right half of region 402 and/or the left half of region 404 are represented in both halves of each of regions 402 and 404. However, frequencies between (i) the first cut-off frequency and (ii) a second cut-off frequency of the PSFs in the left half of region 402 and/or the right half of region 404 are represented in the left half of region 402 and the right half of region 404, but not in the right half of region 402 and the left half of region 404. Accordingly, when the PSFs of region 402 and 404 are added to form the PSFs of region 400, the frequencies between the first cut-off frequency and the second cut-off frequency are underrepresented (e.g., their relative power is lower) as compared with frequencies below the first cut-off frequency. Thus, summing pixel values of the sub-images does not take advantage of the differences in spatial frequency content present at different portions of the sub-images.

The PSFs in FIG. 4 correspond to an out-of-focus plane positioned on a first side of the focus plane and/or depth of field (e.g., between (i) the camera device and (ii) the focus plane and/or depth of field). When the out-of-focus plane is instead positioned on a second side of the focus plane (e.g., beyond the focus plane), the pattern of PSFs shown in FIG. 4 may be different. For example, the pattern of PSFs may be flipped, and may be approximated by the PSFs of region 402 and region 404 switching places. A corresponding PSF variation may additionally or alternatively be observed when each split-pixel is instead divided into a top photosite and a bottom photosite, and/or into four photosites that divide the split-pixel into four quadrants, among other possibilities. The relationship between PSF cut-off frequencies across the area of the image sensor and scene feature position relative to the depth of field may vary among camera models, and may thus be empirically determined on a per-camera-model basis.

V. EXAMPLE SYSTEM FOR GENERATING ENHANCED IMAGES

Figure 5:
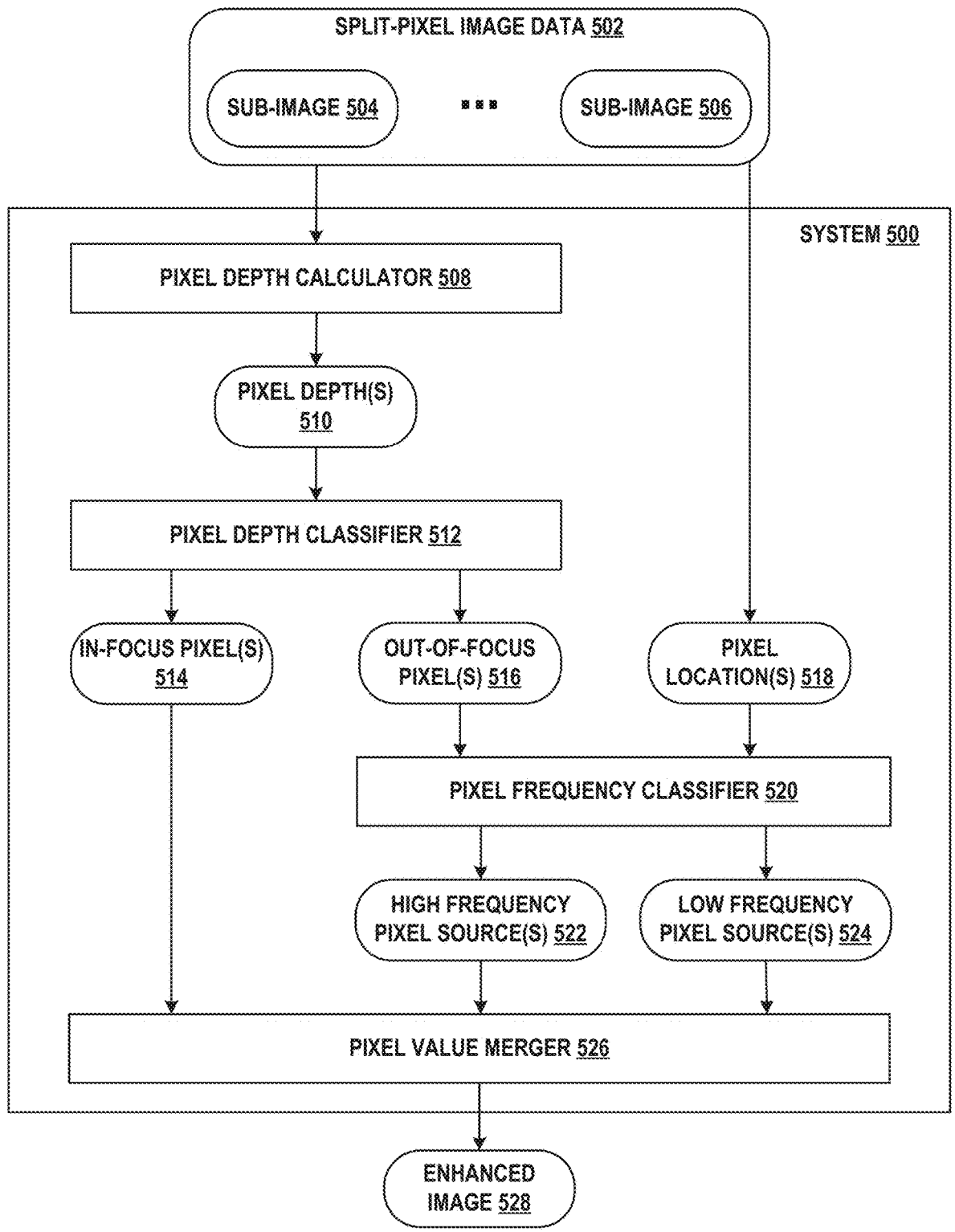
FIG. 5 illustrates a system, in accordance with examples described herein.

The presence of high-frequency spatial information in different parts of the split-pixel sub-images may be used to enhance split-pixel images by improving the sharpness of the split-pixel images, and thus effectively extending the corresponding depth of field. Specifically, FIG. 5 illustrates an example system for generating enhanced images by taking advantage of high-frequency information present in some parts of split-pixel sub-images. FIG. 5 illustrates system 500 configured to generate enhanced image 528 based on split-pixel image data 502. System 500 may include pixel depth calculator 508, pixel depth classifier 512, pixel frequency classifier 520, and pixel value merger 526. The components of system 500 may be implemented as hardware, software, or a combination thereof.

Split-pixel image data 502 may include sub-image 504 through sub-image 506 (i.e., sub-images 504-506). Split-pixel image data 502 may be captured by split-pixel image sensor 300. Each sub-image of sub-images 504-506 may have the same resolution as split-pixel image data 502, and may be captured as part of a single exposure. Accordingly, each respective pixel of split-pixel image data 502 may be associated with a corresponding pixel in each of sub-images 504-506. In one example, split-pixel image data 502 may include two sub-images, and may thus be referred to as dual-pixel image data. In another example, split-pixel image data 502 may include four sub-images, and may thus be referred to as quad-pixel image data.

When split-pixel image data 502 represents scene features that are positioned outside of the depth of field of the split-pixel camera (resulting in corresponding light being focused outside of the depth of focus of the split-pixel camera), some of sub-images 504-506 may include high-frequency spatial information that might not be present in other ones of sub-images 504-506. The term "high-frequency" and/or variations thereof are used herein to refer to frequencies above a threshold frequency, where a first split-pixel sub-image contains frequency content above the threshold frequency while a corresponding second split-pixel sub-image does not. Conversely, the term "low-frequency" and/or variations thereof are used herein to refer to frequencies below and including the threshold frequency. The threshold frequency may vary depending on the split-pixel camera and/or the scene being photographed, among other factors.

Pixel depth calculator 508 may be configured to determine pixel depth(s) 510 for a plurality of pixels of split-pixel image data 502. For example, pixel depth(s) 510 may correspond to all of the pixels of split-pixel image data 502, or less than all of the pixels of split-pixel image data 502. Pixel depth(s) 510 may indicate the depth of corresponding scene feature(s) (e.g., objects and/or portions thereof) relative to the depth of field of the split-pixel camera, and/or the depth of corresponding images of the scene feature(s) relative to the depth of focus of the split-pixel camera. In some implementations, pixel depth(s) 510 may include a binary representation of, for example, the depth associated with the corresponding scene feature, indicating whether the corresponding scene feature is positioned behind (e.g., on a first side) the depth of field of the split-pixel camera or in front (e.g., on a second side) of the depth of field of the split-pixel camera. In some cases, pixel depth(s) may include a ternary representation that is additionally configured to indicate that, for example, the corresponding scene feature is positioned and/or focused within the depth of field of the split-pixel camera.

In other implementations, pixel depth(s) 510 may take on more than three values, and may thus indicate, for example, how far in front of the depth of field and/or how far behind the depth of field the corresponding scene feature is positioned. It is to be understood that when a scene feature is positioned outside of the depth of field (i.e., the region in front of the lens, scene features within which will produce images that appear sufficiently focused) of a split-pixel camera, a corresponding image (i.e., light representing the corresponding scene feature) is also positioned (i.e., focused) outside of a depth of field (i.e., the region behind the lens within which images appear sufficiently focused) of the split-pixel camera.

Pixel depth calculator 508 may be configured to determine the depth value of a respective pixel based on the signal disparity between (i) a corresponding first pixel in a first sub-image of sub-images 504-506 and (ii) a corresponding second pixel in a second sub-image of sub-images 504-506. Specifically, the signal disparity may be positive when scene features are positioned on a first side of the depth of field, and may be negative when scene features are positioned on a second side of the depth of field. Thus, the sign of the disparity may indicate the direction, relative to the depth of field, of the depth value of the respective pixel, while the magnitude of the disparity may indicate the magnitude of the depth value. In the case of quad-pixel image data, the depth value may additionally or alternatively be based on a corresponding third pixel in a third sub-image of sub-images 504-506 and a corresponding fourth pixel in a fourth sub-image of sub-images 504-506.

Pixel depth classifier 512 may be configured to identify, based on pixel depth(s) 510, (i) in-focus pixel(s) 514 of split-pixel image data 502 and (ii) out-of-focus pixel(s) 516 of split-pixel image data 502. In-focus pixel(s) 514 may represent scene features that are positioned within the depth of field (e.g., within a threshold distance on either side of a focus plane), and thus might not undergo a depth of field and/or sharpness enhancement. Out-of-focus pixel(s) 516 may represent scene features that are positioned outside of the depth of field (e.g., outside of the threshold distance on either side of a focus plane), and thus may undergo a depth of field and/or sharpness enhancement. Each respective out-of-focus pixel of out-of-focus pixel(s) 516 may be associated with a corresponding pixel location of pixel location(s) 518, where the corresponding pixel location indicates, for example, the coordinates of the respective out-of-focus pixel within split-pixel image data 502. Each respective out-of-focus pixel may also be associated with a corresponding pixel depth of pixel depth(s) 510.

Pixel frequency classifier 520 may be configured to identify, for each respective out-of-focus pixel of out-of-focus pixel(s) 516, high frequency pixel source(s) 522 and low frequency pixel source(s) 524. Specifically, pixel frequency classifier 520 may be configured to identify high frequency pixel source(s) 522 and low frequency pixel source(s) 524 based on the location of the respective pixel within split-pixel image data 502 and the depth value associated with the respective pixel. High frequency pixel source(s) 522 for the respective out-of-focus pixel may include locationally-corresponding pixels(s) of a first subset of sub-images 504-506, while low frequency pixel source(s) 524 for the respective out-of-focus pixel may include locationally-corresponding pixels(s) of a second subset of sub-images 504-506. The first subset and the second subset determined for the respective pixel may be mutually exclusive.

In the case of dual-pixel image data, high frequency pixel source(s) 522 may indicate, for example, that sub-image 504 contains sharper (i.e., higher frequency) image content for the respective pixel and low frequency pixel source(s) 524 may indicate that sub-image 506 contains less sharp (i.e., lower frequency) image content for the respective pixel. In the case of quad-pixel image data, high frequency pixel source(s) 522 may indicate, for example, that sub-image 506 contains sharper image content for the respective pixel and low frequency pixel source(s) 524 may indicate that all other sub-images, including sub-image 504, contain less sharp image content for the respective pixel. Pixel source selection is illustrated in and discussed in more detail with respect to FIGS. 6A-7G.

Pixel value merger 526 may be configured to generate enhanced image 528 based on (i) in-focus pixel(s) 514 and (ii) high frequency pixel source(s) 522 and low frequency pixel source(s) 524 determined for each respective out-of-focus pixel of out-of-focus pixel(s) 516. Specifically, pixel value merger 526 may be configured to generate respective pixel values for in-focus pixel(s) 514 by summing the spatially-corresponding pixel values of sub-images 504-506. For out-of-focus pixel(s) 516, pixel value merger 526 may be configured to generate respective pixel values by giving greater weight to high frequency pixel source(s) 522 than to low frequency pixel source(s) 524 (at least with respect to some frequencies) to thereby increase the apparent sharpness and/or depth of field of the corresponding parts of split-pixel image data 502.

VI. EXAMPLE RELATIONSHIPS BETWEEN PIXEL DEPTH, PIXEL LOCATION, AND SUB-IMAGE FREQUENCY CONTENT

FIGS. 6A-6F illustrate example mappings between locations of respective pixels within dual-pixel image data, depth values associated with the respective pixels, and sub-images that contain high frequency image contents. Specifically, each of FIGS. 6A-6F shows, on the left side, an area of the dual-pixel image divided into four quadrants labeled with a corresponding depth and, on the right side, corresponding sub-image quadrants that, given the corresponding depth, provide high frequency content for each of the quadrants of the dual-pixel image.

A quadrant of an image may be a rectangular region spanning one fourth of an image frame and resulting from horizontal and vertical bisection of the image frame. Thus, four quadrants may span the entirety of the image frame and divide the image frame into four equal subsections. Similarly, a half of the image may be a union of two adjacent quadrants. For example, the union of two horizontally-adjacent quadrants may define a top half or a bottom half, and the union of two vertically-adjacent quadrants may define a left half or a right half. Stated another way, a top half and a bottom half of the image may be defined by a horizontal bisection of the image into two equal rectangular regions, while a left half and a right half of the image may be defined by a vertical bisection of the image into two equal rectangular regions. The overall split-pixel image (e.g., image data 502), the sub-images (e.g., sub-images 504-506), and/or the enhanced image (e.g., enhanced image 528) may each be divided into corresponding halves and/or quadrants.

Figure 6A:
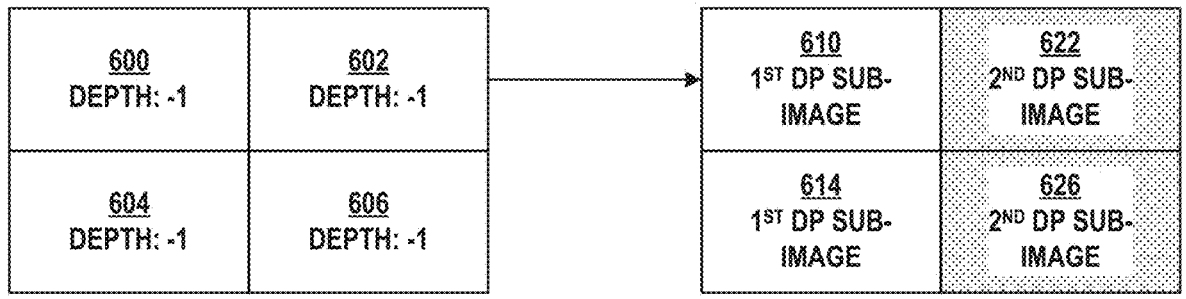
FIGS. 6A, 6B, 6C, 6D, 6E, and 6F show pixel sources corresponding to different combinations of pixel depth and pixel location of dual-pixel image data, in accordance with examples described herein.

FIG. 6A shows that when quadrants 600, 602, 604, and 606 of the dual-pixel image sensor are each used to image a plane (i.e., a scene having a constant depth relative to the split-pixel camera) that is positioned on a first side (e.g., behind) of the depth of field, as indicated by DEPTH: −1, then: (i) quadrant 610 of the first dual-pixel sub-image contains higher frequency content for quadrant 600 than correspondingly-located quadrant 620 of the second dual-pixel sub-image, (ii) quadrant 622 of the second sub-image contains higher frequency content for quadrant 602 than correspondingly-located quadrant 612 of the first sub-image, (iii) quadrant 614 of the first sub-image contains higher frequency content for quadrant 604 than correspondingly-located quadrant 624 of the second sub-image, and (iv) quadrant 626 of the second sub-image contains higher frequency content for quadrant 606 than correspondingly-located quadrant 616 of the first sub-image.

Figure 6B:
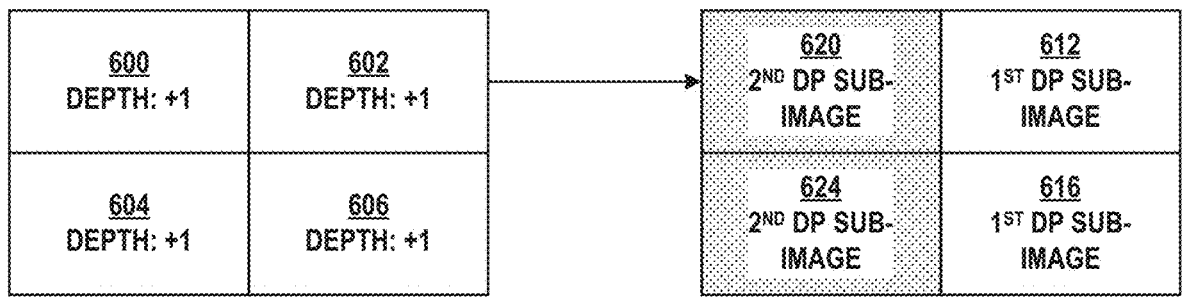

FIG. 6B shows that when quadrants 600, 602, 604, and 606 of the dual-pixel image sensor are each used to image a plane that is positioned on a second side (e.g., in front) of the depth of field, as indicated by DEPTH: +1, then: (i) quadrant 620 of the second sub-image contains higher frequency content for quadrant 600 than correspondingly-located quadrant 610 of the first sub-image, (ii) quadrant 612 of the first sub-image contains higher frequency content for quadrant 602 than correspondingly-located quadrant 622 of the second sub-image, (iii) quadrant 624 of the second sub-image contains higher frequency content for quadrant 604 than correspondingly-located quadrant 614 of the first sub-image, (iv) quadrant 616 of the first sub-image contains higher frequency content for quadrant 606 than correspondingly-located quadrant 626 of the second sub-image.

Figure 6C:
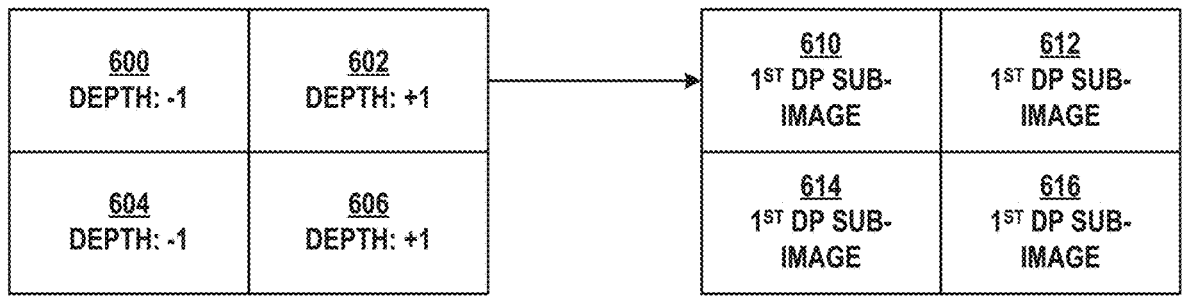

FIG. 6C shows that when quadrants 600 and 604 are each used to image a plane that is positioned on the first side of the depth of field, as indicated by DEPTH: −1, and quadrants 602 and 606 are each used to image a plane that is positioned on the second side of the depth of field, as indicated by DEPTH: +1, then quadrants 610, 612, 614, and 616 of the first sub-image contains higher frequency content for quadrants 600, 602, 604, and 606, respectively, than quadrants 620, 622, 624, and 626, respectively, of the second sub-image.

Figure 6D:
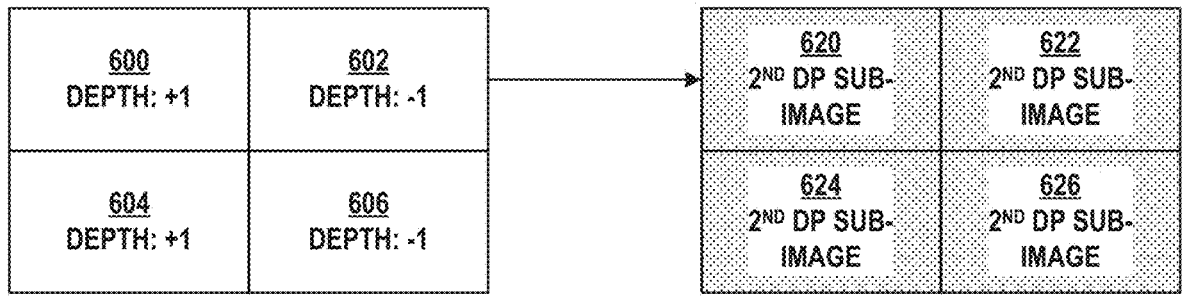

FIG. 6D shows that when quadrants 600 and 604 are each used to image a plane that is positioned on the second side of the depth of field, as indicated by DEPTH: +1, and quadrants 602 and 606 are each used to image a plane that is positioned on the first side of the depth of field, as indicated by DEPTH: −1, then quadrants 620, 622, 624, and 626 of the second sub-image contains higher frequency content for quadrants 600, 602, 604, and 606, respectively, than quadrants 610, 612, 614, and 616, respectively, of the first sub-image.

Figure 6E:
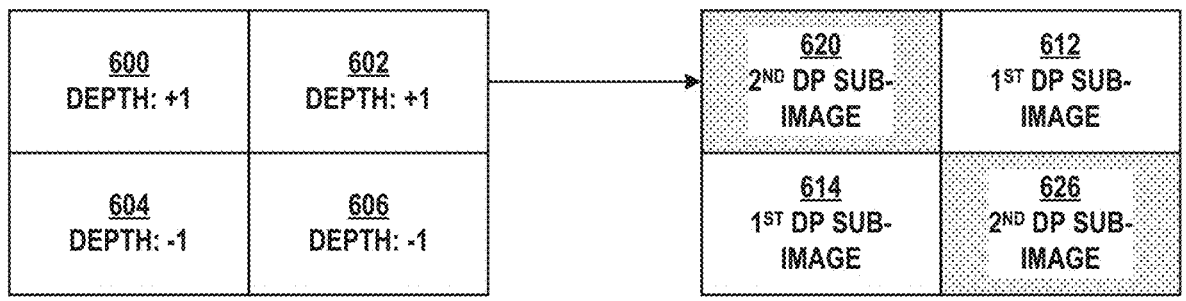

FIG. 6E shows that when quadrants 600 and 602 are each used to image a plane that is positioned on the second side of the depth of field, as indicated by DEPTH: +1, and quadrants 604 and 606 are each used to image a plane that is positioned on the first side of the depth of field, as indicated by DEPTH: −1, then: (i) quadrants 612 and 614 of the first sub-image contain higher frequency content for quadrants 602 and 604, respectively, than quadrants 622 and 624, respectively, of the second sub-image and (ii) quadrants 620 and 626 of the second sub-image contain higher frequency content for quadrants 600 and 606, respectively, than quadrants 610 and 616, respectively, of the first sub-image.

Figure 6F:
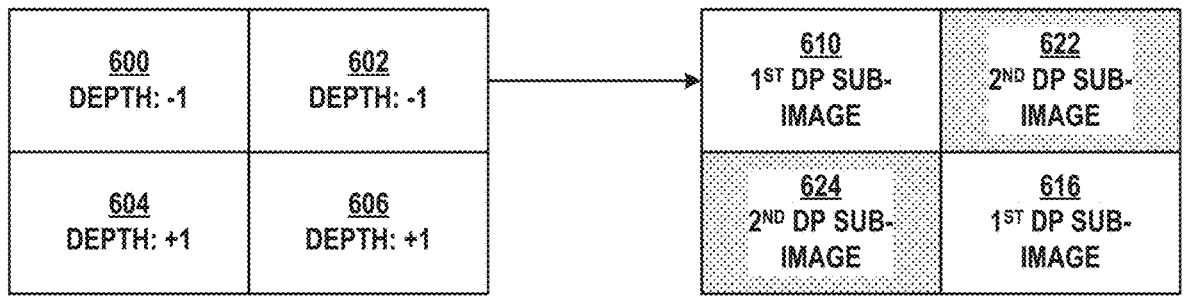

FIG. 6F shows that when quadrants 600 and 602 are each used to image a plane that is positioned on the first side of the depth of field, as indicated by DEPTH: −1, and quadrants 604 and 606 are each used to image a plane that is positioned on the second side of the depth of field, as indicated by DEPTH: +1, then: (i) quadrants 610 and 616 of the first sub-image contain higher frequency content for quadrants 600 and 606, respectively, than quadrants 620 and 626, respectively, of the second sub-image and (ii) quadrants 622 and 624 of the second sub-image contain higher frequency content for quadrants 602 and 604, respectively, than quadrants 612 and 614, respectively, of the first sub-image.

FIG. 6G shows table 630 that summarizes the relationships illustrated by the example pixel location and pixel depth combinations of FIGS. 6A-6F. Specifically, when the scene feature is positioned within the depth of field (i.e., Scene Depth=0), the frequency content of the first sub-image is substantially and/or approximately the same as the frequency content of the second sub-image (e.g., per-frequency signal power differs by no more than a threshold amount). Thus, the pixel values of in-focus pixels may be obtained by adding the values of corresponding pixels in the first sub-image and the second sub-image, without applying unequal weighing to these values to improve sharpness.

When the scene feature is positioned on the first side of the depth of field (i.e., Scene Depth=−1), the first (e.g., left) sub-image provides higher frequency content for out-of-focus pixels located in the first (e.g., left) half (e.g. quadrants 600 and 604) of the dual-pixel image, and the second (e.g., right) sub-image provides higher frequency content for out-of-focus pixels located in the second (e.g., right) half (e.g. quadrants 602 and 606) of the dual-pixel image. When the scene feature is positioned on the second side of the depth of field (i.e., Scene Depth=+1), the second sub-image provides higher frequency content for out-of-focus pixels located in the first half of the dual-pixel image, and the first sub-image provides higher frequency content for out-of-focus pixels located in the second half of the dual-pixel image.

FIGS. 7A-7F illustrate example mappings between locations of respective pixels within quad-pixel image data, depth values associated with the respective pixels, and sub-images that contain high frequency image contents. Specifically, each of FIGS. 7A-7F shows, on the left side, an area of the quad-pixel image divided into quadrants labeled with a corresponding depth and, on the right side, sub-image quadrants that provide high frequency content for each of the quadrants of the quad-pixel image given the corresponding depth.

Figure 7A:
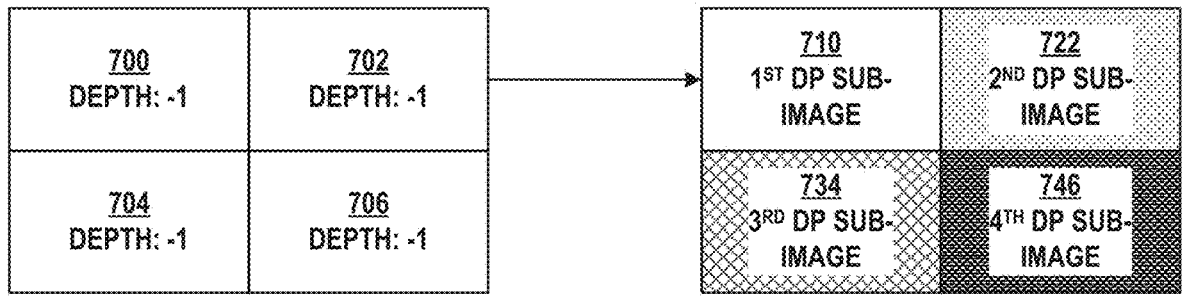
FIGS. 7A, 7B, 7C, 7D, 7E, and 7F show pixel sources corresponding to different combinations of pixel depth and pixel location of quad-pixel image data, in accordance with examples described herein.

FIG. 7A shows that when quadrants 700, 702, 704, and 706 of the quad-pixel image sensor are each used to image a plane that is positioned on the first side of the depth of field, as indicated by DEPTH: −1, then: (i) quadrant 710 of the first quad-pixel sub-image contains higher frequency content for quadrant 700 than corresponding quadrants of the three other quad-pixel sub-images (e.g., correspondingly-located quadrant 740 of the fourth quad-pixel sub-image), (ii) quadrant 722 of the second quad-pixel sub-image contains higher frequency content for quadrant 702 than corresponding quadrants of the three other quad-pixel sub-images (e.g., correspondingly-located quadrant 732 of the third quad-pixel sub-image), (iii) quadrant 734 of the third quad-pixel sub-image contains higher frequency content for quadrant 704 than corresponding quadrants of the three other quad-pixel sub-images (e.g., correspondingly-located quadrant 724 of the second quad-pixel sub-image), and (iv) quadrant 746 of the fourth quad-pixel sub-image contains higher frequency content for quadrant 706 than corresponding quadrants of the three other quad-pixel sub-images (e.g., correspondingly-located quadrant 716 of the first quad-pixel sub-image).

Figure 7B:
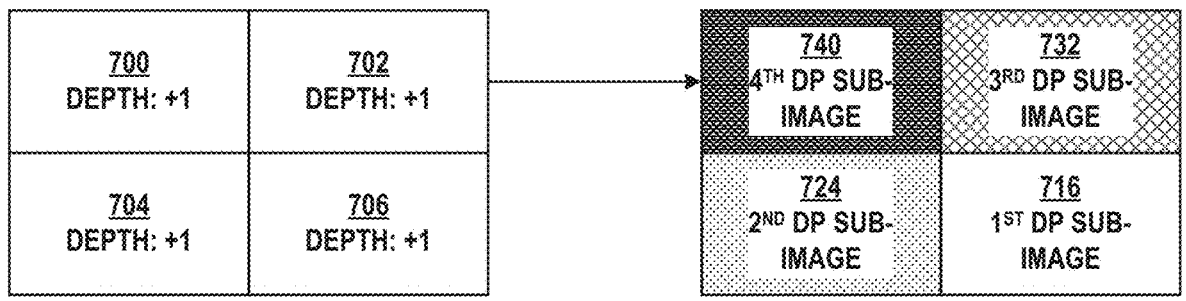

FIG. 7B shows that when quadrants 700, 702, 704, and 706 of the quad-pixel image sensor are each used to image a plane that is positioned on the second side of the depth of field, as indicated by DEPTH: +1, then: (i) quadrant 740 of the fourth sub-image contains higher frequency content for quadrant 700 than corresponding quadrants of the three other sub-images (e.g., correspondingly-located quadrant 710 of the first sub-image), (ii) quadrant 732 of the third sub-image contains higher frequency content for quadrant 702 than corresponding quadrants of the three other sub-images (e.g., correspondingly-located quadrant 722 of the second sub-image), (iii) quadrant 724 of the second sub-image contains higher frequency content for quadrant 704 than corresponding quadrants of the three other sub-images (e.g., correspondingly-located quadrant 734 of the third sub-image), and (iv) quadrant 716 of the first sub-image contains higher frequency content for quadrant 706 than corresponding quadrants of the three other sub-images (e.g., correspondingly-located quadrant 746 of the fourth sub-image).

Figure 7C:
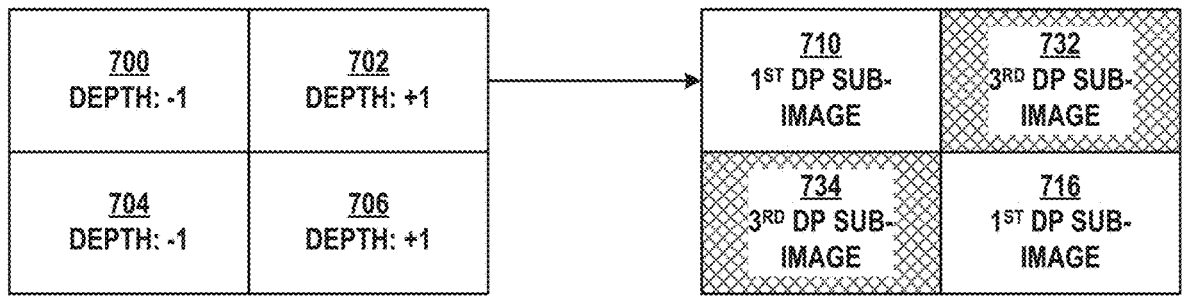

FIG. 7C shows that when quadrants 700 and 704 are each used to image a plane that is positioned on the first side of the depth of field, as indicated by DEPTH: −1, and quadrants 702 and 706 are each used to image a plane that is positioned on the second side of the depth of field, as indicated by DEPTH: +1, then: (i) quadrants 710 and 716 of the first sub-image contain higher frequency content for quadrants 700 and 706, respectively, than corresponding quadrants of the three other sub-images (e.g., quadrants 740 and 746, respectively, of the fourth sub-image) and (ii) quadrants 732 and 734 of the third sub-image contain higher frequency content for quadrants 702 and 704, respectively, than corresponding quadrants of the three other sub-images (e.g., quadrants 722 and 724, respectively, of the second sub-image).

Figure 7D:
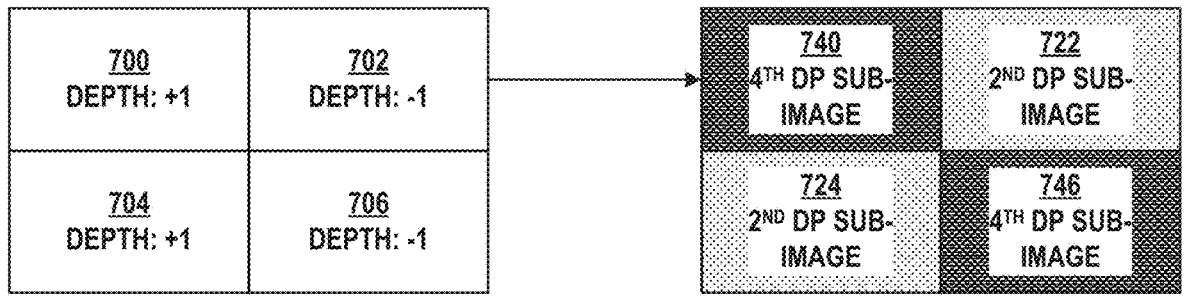

FIG. 7D shows that when quadrants 700 and 704 are each used to image a plane that is positioned on the second side of the depth of field, as indicated by DEPTH: +1, and quadrants 702 and 706 are each used to image a plane that is positioned on the first side of the depth of field, as indicated by DEPTH: −1, then: (i) quadrants 740 and 746 of the fourth sub-image contain higher frequency content for quadrants 700 and 706, respectively, than corresponding quadrants of the three other sub-images (e.g., quadrants 710 and 716, respectively, of the first sub-image) and (ii) quadrants 722 and 724 of the second sub-image contain higher frequency content for quadrants 702 and 704, respectively, than corresponding quadrants of the three other sub-images (e.g., quadrants 732 and 734, respectively, of the third sub-image).

Figure 7E:
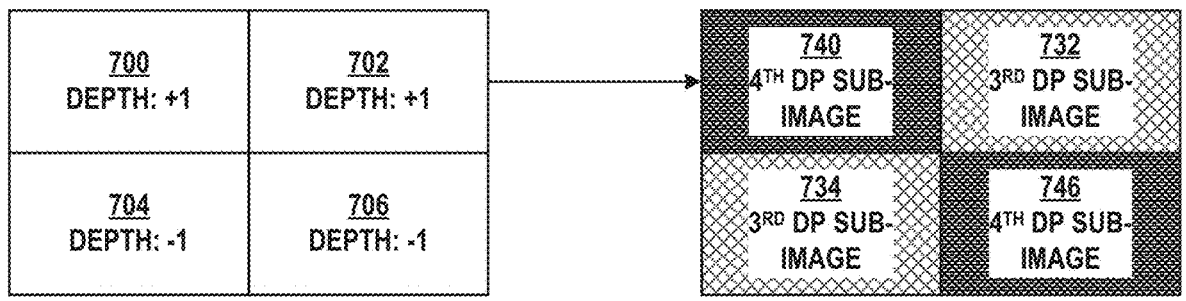

FIG. 7E shows that when quadrants 700 and 702 are each used to image a plane that is positioned on the second side of the depth of field, as indicated by DEPTH: +1, and quadrants 704 and 706 are each used to image a plane that is positioned on the first side of the depth of field, as indicated by DEPTH: −1, then: (i) quadrants 740 and 746 of the fourth sub-image contain higher frequency content for quadrants 700 and 706, respectively, than corresponding quadrants of the three other sub-images (e.g., quadrants 710 and 716, respectively, of the first sub-image) and (ii) quadrants 732 and 734 of the third sub-image contain higher frequency content for quadrants 702 and 704, respectively, than corresponding quadrants of the three other sub-images (e.g., quadrants 722 and 724, respectively, of the second sub-image).

Figure 7F:
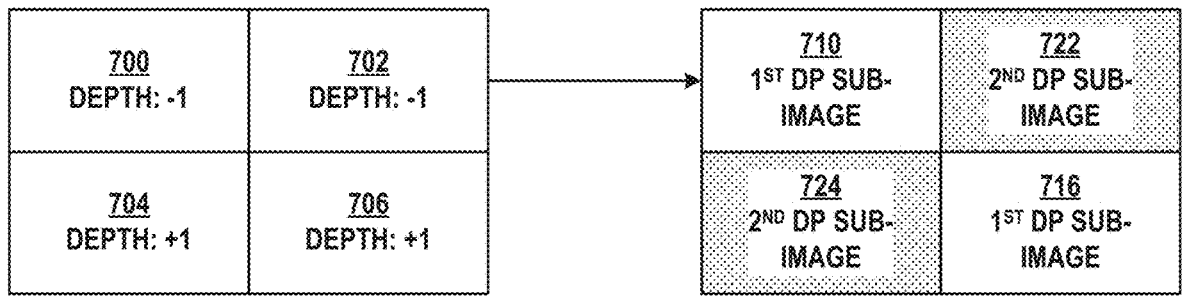

FIG. 7F shows that when quadrants 700 and 702 are each used to image a plane that is positioned on the first side of the depth of field, as indicated by DEPTH: −1, and quadrants 704 and 706 are each used to image a plane that is positioned on the second side of the depth of field, as indicated by DEPTH: +1, then: (i) quadrants 710 and 716 of the first sub-image contain higher frequency content for quadrants 700 and 706, respectively, than corresponding quadrants of the three other sub-images (e.g., quadrants 740 and 746, respectively, of the fourth sub-image) and (ii) quadrants 722 and 724 of the third sub-image contain higher frequency content for quadrants 702 and 704, respectively, than corresponding quadrants of the three other sub-images (e.g., quadrants 732 and 734, respectively, of the third sub-image).

FIG. 7G shows table 750 that summarizes the relationship illustrated by the example pixel location and pixel depth combinations of FIGS. 7A-7F. Specifically, when the scene feature is positioned within the depth of field (i.e., Scene Depth=0), the frequency contents of the first sub-image, the second sub-image, the third sub-image, and the fourth sub-image are substantially and/or approximately the same. Thus, the pixel values of in-focus pixels may be obtained by adding the values of corresponding pixels in the first through fourth sub-images, without applying unequal weighing to these values to improve sharpness.

When the scene feature is positioned on the first side of the depth of field (i.e., Scene Depth=−1), the first sub-image provides higher frequency content for out-of-focus pixels located in the first quadrant (e.g., quadrant 700) of the quad-pixel image, the second sub-image provides higher frequency content for out-of-focus pixels located in the second quadrant (e.g., quadrant 702) of the quad-pixel image, the third sub-image provides higher frequency content for out-of-focus pixels located in the third quadrant (e.g., quadrant 704) of the quad-pixel image, and the fourth sub-image provides higher frequency content for out-of-focus pixels located in the fourth quadrant (e.g., quadrant 706) of the quad-pixel image.

When the scene feature is positioned on the second side of the depth of field (i.e., Scene Depth=+1), the fourth sub-image provides higher frequency content for out-of-focus pixels located in the first quadrant (e.g., quadrant 700) of the dual-pixel image, the third sub-image provides higher frequency content for out-of-focus pixels located in the second quadrant (e.g., quadrant 702) of the dual-pixel image, the second sub-image provides higher frequency content for out-of-focus pixels located in the third quadrant (e.g., quadrant 704) of the dual-pixel image, and the first sub-image provides higher frequency content for out-of-focus pixels located in the fourth quadrant (e.g., quadrant 706) of the dual-pixel image.

While FIGS. 6A-6G and 7A—7G illustrate the relationships between pixel location, pixel depth, and high frequency data source on a per-quadrant level (for clarity of illustration), in practice, the determination of the high frequency pixel source may be made on a per-pixel level (based on per-pixel locations and per-pixel depths). Thus, a particular pixel's high frequency source may be determined using the relationships shown in FIGS. 6A-6G and/or 7A-7G based on (i) the particular pixel's corresponding depth and (ii) the half (in the case of dual-pixel images) or quadrant (in the case of quad-pixel images) of the split-pixel image in which the particular pixel is located. Accordingly, although FIGS. 6A-6F and 7A—7F show particular arrangements of pixel depths for the purpose of illustration of the relationships shown in FIGS. 6G and 7G, respectively, different distributions and/or combinations of pixel depth may be observed in practice. The relationships shown in FIGS. 6G and 7G may be used to identify, for each pixel in the split-pixel image, a corresponding sub-image that contains high frequency information that may be absent from the other split-pixel images.

VII. EXAMPLE PIXEL VALUE MERGING

Turning back to FIG. 5, pixel value merger 526 may be configured to combine the corresponding pixel values of high frequency pixel source(s) 522 and low frequency pixel source(s) 524 in a plurality of ways. In particular, for out-of-focus pixel(s) 516, pixel value merger 526 may be configured to favor, or give greater weight to, high frequency pixel source(s) 522 than to low frequency pixel source(s) 524. In some cases, greater weight may be given to high frequency pixel source(s) 522 than to low frequency pixel source(s) 524 with respect to all frequencies. In other cases, greater weight may be given to high frequency pixel source(s) 522 than to low frequency pixel source(s) 524 with respect to frequencies above a threshold frequency (e.g., cut-off frequency separating the frequency content of different sub-images), and while equal weight may be given to frequencies below or equal to the threshold frequency.

In one example, the combination of pixel values may be performed in the spatial domain. A given pixel of enhanced image 528 corresponding to an out-of-focus pixel of split-pixel image data 502 (i.e., where $D_{i,j} \notin$ Depth of Field (DOF)) may be expressed as $P_{i,j}^{ENHANCED} = w_1(i,j,D_{i,j})P_{i,j}^1 + \ldots + w_N(i,j,D_{i,j})P_{i,j}^N$, where $P_{i,j}$ represents the pixel value at pixel location (i.e., coordinates) i,j of a given image, $P^{ENHANCED}$ represents enhanced image 528, $P^1$ represents sub-image 504, $P^N$ represents sub-image 506, $D_{i,j}$ represents the depth value associated with the pixel at pixel location i,j, and $w_1(i,j,D_{i,j})$ through $w_N(i,j,D_{i,j})$ are weighting functions configured to favor the corresponding high frequency pixel source(s) 522 over the low frequency pixel source(s) 524. In some cases, for each respective pixel location (i,j), the sum of weights may be normalized to a predetermined value, such as N (e.g., $\Sigma_{M=1}^{N} w_M(i,j,D_{i,j})=N$). A given pixel of enhanced image 528 corresponding to an in-focus pixel of split-pixel image data 502 (i.e., where $D_{i,j} \in$ DOF) may be expressed as $P_{i,j}^{ENHANCED} = P_{i,j}^1 + \ldots + P_{i,j}^N$, where $(i,j,D_{i,j}) = \ldots = w_N(i,j,D_{i,j})=1$.

In one example, in the case of dual-pixel image data, $$P_{i,j}^{ENHANCED} = \frac{3}{2}P_{i,j}^1 + \frac{1}{2}P_{i,j}^2$$

when $P^1$ is the high frequency pixel source (and $P^2$ is thus the low frequency pixel source) for pixel location i,j. That is, for a given out-of-focus pixel of split-pixel image data 502, the pixel value from the high frequency pixel source may be weighted more heavily than (i.e., assigned a weight greater than) the pixel value from the low frequency pixel source in order to sharpen the given out-of-focus pixel. In another example, in the case of dual-pixel image data, $P_{i,j}^{ENHANCED} = 2P_{i,j}^1 + (0)P_{i,j}^2 = 2P_{i,j}^1$ when $P^1$ is the high frequency pixel source (and $P^2$ is thus the low frequency pixel source) for pixel location i,j. That is, for a given out-of-focus pixel of split-pixel image data 502, the high frequency pixel source may be selected as the exclusive source of the pixel value, and the low frequency pixel source may be discarded.

The weighting functions $w_1(i,j,D_{i,j})$ through $w_N(i,j,D_{i,j})$ may be discrete or continuous functions of $D_{i,j}$. The weighting functions $w_1(i,j,D_{i,j})$ through $w_N(i,j,D_{i,j})$ may be a linear function of $D_{i,j}$ or may be an exponential function of $D_{i,j}$, among other possibilities. The weight assigned to a particular high frequency pixel source by its corresponding weighting function may result in the high frequency pixel source making up between (i) 50% of the signal of the corresponding pixel in enhanced image 528 (e.g., when $D_{i,j} \in$ DOF) and (ii) 100% of the signal of the corresponding pixel in enhanced image 528 (e.g., when $|D_{i,j}| > D_{THRESHOLD}$).

In another example, the combination of pixel values may be performed in the frequency domain. For example, a given pixel of enhanced image 528 corresponding to an out-of-focus pixel of split-pixel image data 502 (i.e., where $D_{i,j} \in$ DOF) may be expressed as $P_{i,j}^{ENHANCED} = IFT(F^{ENHANCED}(\omega)) = IFT(v_1(\omega,i,j,D_{i,j})F^1(\omega) + \ldots + v_N(\omega,i,j,D_{i,j})F^N(\omega))$, where $\omega=(\omega_x,\omega_y)$ represents the horizontal spatial frequencies and vertical spatial frequencies, respectively, that may be present in a split-pixel image data 502, $F^{ENHANCED}$ represents enhanced image 528 in the frequency domain, $F^1(\omega)$ represents sub-image 504 in the frequency domain, $F^N(\omega)$ represents sub-image 506 in the frequency domain, $D_{i,j}$ represents the depth value associated with the pixel at coordinate i,j, IFT( ) represents an inverse frequency transform (e.g., Inverse Fourier Transform, Inverse Cosine Transform, etc.), and $v_1(\omega,i,j,D_{i,j})$ through $v_N(\omega,i,j,D_{i,j})$ are frequency-specific weighting functions configured to boost high frequencies that are present in the corresponding high frequency pixel source(s) 522 relative to the low frequencies present in both the corresponding high frequency pixel source(s) 522 and the corresponding low frequency pixel source(s) 524. In some cases, for each respective spatial frequency $\omega$ of a given pixel, the sum of weights may be normalized to a predetermined value, such as N (e.g., $\Sigma_{M=1}^{N} v_M(\omega,i,j,D_{i,j})=N$). A given pixel of enhanced image 528 corresponding to an in-focus pixel of split-pixel image data 502 (i.e., where $D_{i,j} \in$ DOF) may be expressed as $P_{i,j}^{ENHANCED} = IFT(F^1(\omega) + \ldots + F^N(\omega))$, where $v_1(\omega,i,j,D_{i,j}) = \ldots = v_N(\omega,i,j,D_{i,j})=1$.

In some implementations, the weighting functions $v_1(\omega,i,j,D_{i,j})$ through $v_N(\omega,i,j,D_{i,j})$ may additionally or alternatively be a function of differences in frequency content among the sub-images. For example, for spatial frequencies above a threshold frequency (i.e., $\forall \omega > \omega_{THRESHOLD}$), a high frequency pixel source may be weighted more heavily than a low frequency pixel source when the difference between these sources exceeds a threshold difference, and the two pixel sources may be weighted equally if the difference between these sources is below or equal to the threshold difference. For spatial frequencies below or equal to the threshold frequency (i.e., $\forall \omega \leq \omega_{THRESHOLD}$), the high frequency pixel source and the low frequency pixel source may be weighted equally.

Thus, in the context of dual-pixel image data, $\forall \omega > \omega_{THRESHOLD}$, $W_1(\omega,i,j,D_{i,j}) > W_2(\omega,i,j,D_{i,j})$ when $F^1(\omega) - F^2(\omega) > F_{THRESHOLD}$ (with $F^1(\omega)$ being the high frequency pixel source), $W_2(\omega,i,j,D_{i,j}) > W_1(\omega,i,j,D_{i,j})$ when $F^2(\omega) - F^1(\omega) > F_{THRESHOLD}$ (with $F^2(\omega)$ being the high frequency pixel source), and $W_1(\omega,i,j,D_{i,j}) = W_2(\omega,i,j,D_{i,j})$ when $|F^1(\omega) - F^2(\omega)| \leq F_{THRESHOLD}$. $\forall \omega \leq \omega_{THRESHOLD}$ $W_1(\omega,i,j,D_{i,j}) = W_2(\omega,i,j,D_{i,j})$.

The threshold frequency may be based on (e.g., equal to) the cut-off frequency of the low frequency pixel source. The threshold difference may be based on (e.g., greater than twice the average or peak of) noise levels expected to be present in the sub-images at different frequencies. Thus, for out-of-focus pixels, high frequency contents of the high frequency pixel source(s) 522 (which are absent from the low frequency pixel source) may be boosted to sharpen the split-pixel image, while low frequency contents present in both pixel sources 522 and 524 may be equally weighted to preserve the contents of both sources at these frequencies.

The weighting functions $v_1(\omega,i,j,D_{i,j})$ through $v_N(\omega,i,j,D_{i,j})$ may be discrete or continuous functions of $D_{i,j}$, and/or may be linear or exponential functions of $D_{i,j}$, among other possibilities. The weight assigned, by its corresponding weighting function, to a particular frequency present in high frequency pixel source may result in the high frequency pixel source making up between (i) 50% of the frequency-specific signal of the corresponding pixel in enhanced image 528 (e.g., when $D_{i,j} \in DOF$ and/or when $\omega \leq \omega_{THRESHOLD}$) and (ii) 100% of the frequency-specific signal of the corresponding pixel in enhanced image 528 (e.g., when $|D_{i,j}| > D_{THRESHOLD}$ and/or when $\omega > \omega_{THRESHOLD}$).

In another example, the combination of pixel values may be performed using one or more algorithms configured to merge an image focus stack. Specifically, an image focus stack may include a plurality of images, with each image captured at a corresponding different focus (resulting in a different position of the depth of focus and/or the depth of field). Thus, different images of the image focus stack may include differing in-focus portions and out-of-focus portions. Algorithms configured to merge an image focus stack may involve, for example, (i) computing per-pixel weights based on the pixel's contrast and using the per-pixel weights to combine the images of the focus stack, (ii) determining a depth map for each image in the focus stack and using the depth maps to identify the sharpest pixel values in the focus stack, and/or (iii) using a pyramid-based approach to identify the sharpest pixels, among other possibilities.

In the context of non-split-pixel image data, the image focus stack may include motion blur due to different images in the image focus stack being captured at different times. Thus, reconstruction of an image with enhanced sharpness may be difficult for scenes that include motion.

In the context of split-pixel image data, the plurality of sub-images of the split-pixel image data may be used to form the image focus stack. Variation in the spatial frequency content of the sub-images in out-of-focus regions of split-pixel image data may approximate different focus levels (and thus different depth of focus and depth of field positions). Since the spatial frequency content variation of the sub-images may be achieved without explicit adjustment of the focal distance of the split-pixel camera, the split-pixel sub-images may be captured as part of a single exposure, and thus might not include motion blur (or may at least include less motion blur than a comparable non-split-pixel image focus stack). Accordingly, split-pixel sub-images may be merged using one or more focus stacking algorithms, and thus used to generate enhanced images for static and/or dynamic scenes.

VIII. ADDITIONAL EXAMPLE OPERATIONS

Figure 8:
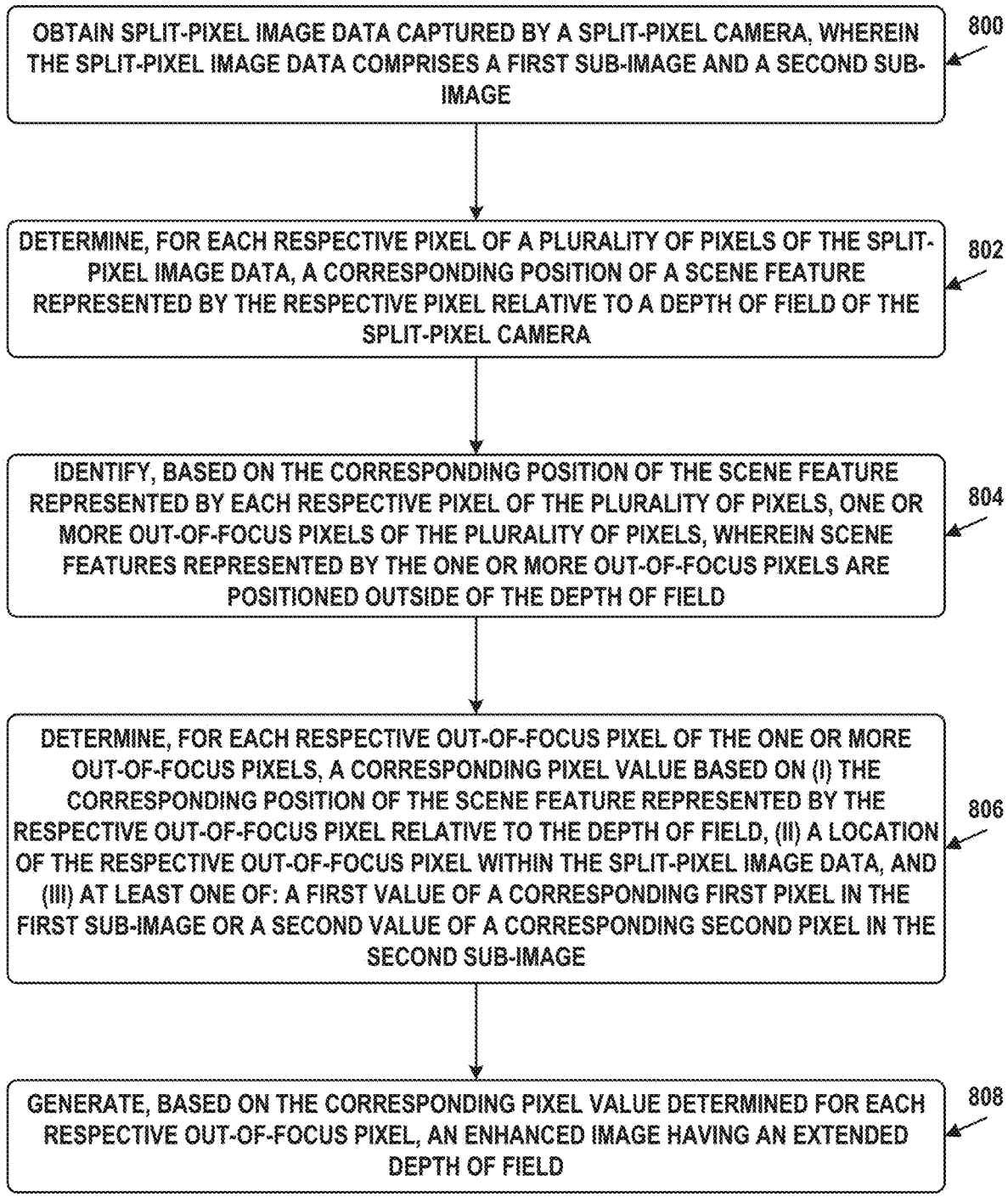
FIG. 8 is a flow chart, in accordance with examples described herein.

FIG. 8 illustrates a flow chart of operations related to generation of images with an enhanced sharpness and/or depth of field. The operations may be carried out by computing device 100, computing system 200, and/or system 500, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining split-pixel image data captured by a split-pixel camera, wherein the split-pixel image data comprises a first sub-image and a second sub-image.

Block 802 may involve determining, for each respective pixel of a plurality of pixels of the split-pixel image data, a corresponding position of a scene feature represented by the respective pixel relative to a depth of field of the split-pixel camera.

Block 804 may involve identifying, based on the corresponding position of the scene feature represented by each respective pixel of the plurality of pixels, one or more out-of-focus pixels of the plurality of pixels, wherein the one or more out-of-focus pixels are positioned outside of the depth of field.

Block 806 may involve determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image.

Block 808 may involve generating, based on the corresponding pixel value determined for each respective out-of-focus pixel, an enhanced image having an extended depth of field.

In some embodiments, determining the corresponding pixel value may include selecting, for each respective out-of-focus pixel, one of: the corresponding first pixel or the corresponding second pixel, as a source pixel for the respective out-of-focus pixel based on (i) the corresponding position of the scene feature represented by the respective out-of-focus pixel relative to the depth of field and (ii) the location of the respective out-of-focus pixel within the split-pixel image data. The corresponding pixel value may be determined for each respective out-of-focus pixel based on a value of the source pixel.

In some embodiments, for out-of-focus pixels located in a first half of the split-pixel image data: the corresponding first pixel may be selected as the source pixel when the scene feature represented by the respective out-of-focus pixel is positioned behind the depth of field, and the corresponding second pixel may be selected as the source pixel when the scene feature represented by the respective out-of-focus pixel is positioned in front of the depth of field. For out-of-focus pixels located in a second half of the split-pixel image data: the corresponding second pixel may be selected as the source pixel when the scene feature represented by the respective out-of-focus pixel is positioned behind the depth of field, and the corresponding first pixel may be selected as the source pixel when the scene feature represented by the respective out-of-focus pixel is positioned in front of the depth of field.

In some embodiments, selecting the source pixel for the respective out-of-focus pixel may include, for out-of-focus pixels located in a first half of the split-pixel image data, determining whether the scene feature represented by the respective out-of-focus pixel is positioned behind the depth of field or in front of the depth of field. Selecting the source pixel for the respective out-of-focus pixel may also include, for out-of-focus pixels located in the first half of the split-pixel image data, based on and/or in response to determining that the scene feature represented by the respective out-of-focus pixel is positioned behind the depth of field, selecting the corresponding first pixel as the source pixel, or based on and/or in response to determining that the scene feature represented by the respective out-of-focus pixel is positioned in front of the depth of field, selecting the corresponding second pixel as the source pixel.

Selecting the source pixel for the respective out-of-focus pixel may additionally include, for out-of-focus pixels located in a second half of the split-pixel image data, determining whether the scene feature represented by the respective out-of-focus pixel is positioned behind the depth of field or in front of the depth of field. Selecting the source pixel for the respective out-of-focus pixel may further include, for out-of-focus pixels located in the second half of the split-pixel image data, based on and/or in response to determining that the scene feature represented by the respective out-of-focus pixel is positioned behind the depth of field, selecting the corresponding second pixel as the source pixel, or based on and/or in response to determining that the scene feature represented by the respective out-of-focus pixel is positioned in front of the depth of field, selecting the corresponding first pixel as the source pixel.

In some embodiments, determining the corresponding pixel value may include determining, for each respective out-of-focus pixel, a first weight for the corresponding first pixel and a second weight for the corresponding second pixel based on (i) the corresponding position of the scene feature represented by the respective out-of-focus pixel relative to the depth of field and (ii) the location of the respective out-of-focus pixel within the split-pixel image data. The corresponding pixel value may be determined for each respective out-of-focus pixel based on (i) a first product of the first weight and the first value of the corresponding first pixel and (ii) a second product of the second weight and the second value of the corresponding second pixel.

In some embodiments, for out-of-focus pixels located in a first half of the split-pixel image data: the first weight for the corresponding first pixel may be greater than the second weight for the corresponding second pixel when the scene feature represented by the respective out-of-focus pixel is positioned behind the depth of field, and the second weight for the corresponding second pixel may be greater than the first weight for the corresponding first pixel when the scene feature represented by the respective out-of-focus pixel is positioned in front of the depth of field. For out-of-focus pixels located in a second half of the split-pixel image data: the second weight for the corresponding second pixel may be greater than the first weight for the corresponding first pixel when the scene feature represented by the respective out-of-focus pixel is positioned behind the depth of field, and the first weight for the corresponding first pixel may be greater than the second weight for the corresponding second pixel when the scene feature represented by the respective out-of-focus pixel is positioned in front of the depth of field.

In some embodiments, determining the first weight and the second weight may include, for out-of-focus pixels located in a first half of the split-pixel image data, determining whether the scene feature represented by the respective out-of-focus pixel is positioned behind the depth of field or in front of the depth of field. Determining the first weight and the second weight may also include, for out-of-focus pixels located in the first half of the split-pixel image data, based on and/or in response to determining that the scene feature represented by the respective out-of-focus pixel is positioned behind the depth of field, determining the first weight that is greater than the second weight, or based on and/or in response to determining that the scene feature represented by the respective out-of-focus pixel is positioned in front of the depth of field, determining the second weight that is greater than the first weight.

Determining the first weight and the second weight may additionally include, for out-of-focus pixels located in a second half of the split-pixel image data, determining whether the scene feature represented by the respective out-of-focus pixel is positioned behind the depth of field or in front of the depth of field. Determining the first weight and the second weight may further include, for out-of-focus pixels located in the second half of the split-pixel image data, based on and/or in response to determining that the scene feature represented by the respective out-of-focus pixel is positioned behind the depth of field, determining the second weight that is greater than the first weight, or based on and/or in response to determining that the scene feature represented by the respective out-of-focus pixel is positioned in front of the depth of field, determining the first weight that is greater than the second weight.

In some embodiments, determining the first weight and the second weight may include determining, for each respective spatial frequency of a plurality of spatial frequencies present within the split-pixel image data, (i) a first magnitude of the respective spatial frequency within the first sub-image and (ii) a second magnitude of the respective spatial frequency within the second sub-image. A difference between the first magnitude and the second magnitude may be determined for each respective spatial frequency. The first weight for the first magnitude and the second weight for the second magnitude may be determined for each respective spatial frequency. For each respective spatial frequency above a threshold frequency and associated with a difference that exceeds a threshold value, the first weight may differ from the second weight, and the first weight and the second weight may be based on the corresponding position of the scene feature represented by the respective out-of-focus pixel relative to the depth of field. For each respective spatial frequency (i) below the threshold frequency or (ii) above the threshold frequency and associated with a difference that does not exceed the threshold value, the first weight may be equal to the second weight. The corresponding pixel value may be determined for each respective out-of-focus pixel based on a sum of (i) a first plurality of products of the first weight and the first magnitude for each respective spatial frequency represented by the first value of the corresponding first pixel and (ii) a second plurality of products of the second weight and the second magnitude for each respective spatial frequency represented by the second value of the corresponding second pixel.

In some embodiments, the split-pixel image data may include the first sub-image, the second sub-image, a third sub-image, and a fourth sub-image. Determining the corresponding pixel value may include selecting, for each respective out-of-focus pixel, one of: the corresponding first pixel in the first sub-image, the corresponding second pixel in the second sub-image, a corresponding third pixel in the third sub-image, or a corresponding fourth pixel in the fourth sub-image, as a source pixel for the respective out-of-focus pixel based on (i) the corresponding position of the scene feature represented by the respective out-of-focus pixel relative to the depth of field and (ii) the location of the respective out-of-focus pixel within the split-pixel image data. The corresponding pixel value may be determined for each respective out-of-focus pixel based on a value of the source pixel.

In some embodiments, for out-of-focus pixels located in a first quadrant of the split-pixel image data: the corresponding first pixel may be selected as the source pixel when the scene feature represented by the respective out-of-focus pixel is positioned behind the depth of field, and the corresponding fourth pixel may be selected as the source pixel when the scene feature represented by the respective out-of-focus pixel is positioned in front of the depth of field. For out-of-focus pixels located in a second quadrant of the split-pixel image data: the corresponding second pixel may be selected as the source pixel when the scene feature represented by the respective out-of-focus pixel is positioned behind the depth of field, and the corresponding third pixel may be selected as the source pixel when the scene feature represented by the respective out-of-focus pixel is positioned in front of the depth of field. For out-of-focus pixels located in a third quadrant of the split-pixel image data: the corresponding third pixel may be selected as the source pixel when the scene feature represented by the respective out-of-focus pixel is positioned behind the depth of field, and the corresponding second pixel may be selected as the source pixel when the scene feature represented by the respective out-of-focus pixel is positioned in front of the depth of field. For out-of-focus pixels located in a fourth quadrant of the split-pixel image data: the corresponding fourth pixel may be selected as the source pixel when the scene feature represented by the respective out-of-focus pixel is positioned behind the depth of field, and the corresponding first pixel may be selected as the source pixel when the scene feature represented by the respective out-of-focus pixel is positioned in front of the depth of field.

In some embodiments, selecting the source pixel for the respective out-of-focus pixel may include, for out-of-focus pixels located in a first quadrant of the split-pixel image data, determining whether the scene feature represented by the respective out-of-focus pixel is positioned behind the depth of field or in front of the depth of field. Selecting the source pixel for the respective out-of-focus pixel may also include, for out-of-focus pixels located in the first quadrant of the split-pixel image data, based on and/or in response to determining that the scene feature represented by the respective out-of-focus pixel is positioned behind the depth of field, selecting the corresponding first pixel as the source pixel, or based on and/or in response to determining that the scene feature represented by the respective out-of-focus pixel is positioned in front of the depth of field, selecting the corresponding fourth pixel as the source pixel.

Selecting the source pixel for the respective out-of-focus pixel may additionally include, for out-of-focus pixels located in a second quadrant of the split-pixel image data, determining whether the scene feature represented by the respective out-of-focus pixel is positioned behind the depth of field or in front of the depth of field. Selecting the source pixel for the respective out-of-focus pixel may further include, for out-of-focus pixels located in the second quadrant of the split-pixel image data, based on and/or in response to determining that the scene feature represented by the respective out-of-focus pixel is positioned behind the depth of field, selecting the corresponding second pixel as the source pixel, or based on and/or in response to determining that the scene feature represented by the respective out-of-focus pixel is positioned in front of the depth of field, selecting the corresponding third pixel as the source pixel.

Selecting the source pixel for the respective out-of-focus pixel may additionally include, for out-of-focus pixels located in a third quadrant of the split-pixel image data, determining whether the scene feature represented by the respective out-of-focus pixel is positioned behind the depth of field or in front of the depth of field. Selecting the source pixel for the respective out-of-focus pixel may further include, for out-of-focus pixels located in the third quadrant of the split-pixel image data, based on and/or in response to determining that the scene feature represented by the respective out-of-focus pixel is positioned behind the depth of field, selecting the corresponding third pixel as the source pixel, or based on and/or in response to determining that the scene feature represented by the respective out-of-focus pixel is positioned in front of the depth of field, selecting the corresponding second pixel as the source pixel.

Selecting the source pixel for the respective out-of-focus pixel may additionally include, for out-of-focus pixels located in a fourth quadrant of the split-pixel image data, determining whether the scene feature represented by the respective out-of-focus pixel is positioned behind the depth of field or in front of the depth of field. Selecting the source pixel for the respective out-of-focus pixel may further include, for out-of-focus pixels located in the fourth quadrant of the split-pixel image data, based on and/or in response to determining that the scene feature represented by the respective out-of-focus pixel is positioned behind the depth of field, selecting the corresponding fourth pixel as the source pixel, or based on and/or in response to determining that the scene feature represented by the respective out-of-focus pixel is positioned in front of the depth of field, selecting the corresponding first pixel as the source pixel.

In some embodiments, the split-pixel image data may include the first sub-image, the second sub-image, a third sub-image, and a fourth sub-image. Determining the corresponding pixel value may include determining, for each respective out-of-focus pixel, a first weight for the corresponding first pixel, a second weight for the corresponding second pixel, a third weight for a corresponding third pixel in the third sub-image, and a fourth weight for a corresponding fourth pixel in the fourth sub-image based on (i) the corresponding position of the scene feature represented by the respective out-of-focus pixel relative to the depth of field and (ii) the location of the respective out-of-focus pixel within the split-pixel image data. The corresponding pixel value may be determined for each respective out-of-focus pixel based on (i) a first product of the first weight and the first value of the corresponding first pixel, (ii) a second product of the second weight and the second value of the corresponding second pixel, (iii) a third product of the third weight and a third value of the corresponding third pixel, and (ii) a fourth product of the fourth weight and a fourth value of the corresponding fourth pixel.

In some embodiments, for out-of-focus pixels located in a first quadrant of the split-pixel image data: the first weight for the corresponding first pixel may be greater than the second weight for the corresponding second pixel, the third weight for the corresponding third pixel, and the fourth weight for the corresponding fourth pixel when the scene feature represented by the respective out-of-focus pixel is positioned behind the depth of field, and the fourth weight for the corresponding fourth pixel may be greater than the first weight for the corresponding first pixel, the second weight for the corresponding second pixel, and the third weight for the corresponding third pixel when the scene feature represented by the respective out-of-focus pixel is positioned in front of the depth of field. For out-of-focus pixels located in a second quadrant of the split-pixel image data: the second weight for the corresponding second pixel may be greater than the first weight for the corresponding first pixel, the third weight for the corresponding third pixel, and the fourth weight for the corresponding fourth pixel when the scene feature represented by the respective out-of-focus pixel is positioned behind the depth of field, and the third weight for the corresponding third pixel may be greater than the first weight for the corresponding first pixel, the second weight for the corresponding second pixel, and the fourth weight for the corresponding fourth pixel when the scene feature represented by the respective out-of-focus pixel is positioned in front of the depth of field. For out-of-focus pixels located in a third quadrant of the split-pixel image data: the third weight for the corresponding third pixel may be greater than the first weight for the corresponding first pixel, the second weight for the corresponding second pixel, and the fourth weight for the corresponding fourth pixel when the scene feature represented by the respective out-of-focus pixel is positioned behind the depth of field, and the second weight for the corresponding second pixel may be greater than the first weight for the corresponding first pixel, the third weight for the corresponding third pixel, and the fourth weight for the corresponding fourth pixel when the scene feature represented by the respective out-of-focus pixel is positioned in front of the depth of field. For out-of-focus pixels located in a fourth quadrant of the split-pixel image data: the fourth weight for the corresponding fourth pixel may be greater than the first weight for the corresponding first pixel, the second weight for the corresponding second pixel, and the third weight for the corresponding third pixel when the scene feature represented by the respective out-of-focus pixel is positioned behind the depth of field, and the first weight for the corresponding first pixel may be greater than the second weight for the corresponding second pixel, the third weight for the corresponding third pixel, and the fourth weight for the corresponding fourth pixel when the scene feature represented by the respective out-of-focus pixel is positioned in front of the depth of field.

In some embodiments, determining the first weight, the second weight, the third weight, and the fourth weight may include, for out-of-focus pixels located in a first quadrant of the split-pixel image data, determining whether the scene feature represented by the respective out-of-focus pixel is positioned behind the depth of field or in front of the depth of field. Determining the first weight, the second weight, the third weight, and the fourth weight may also include, for out-of-focus pixels located in the first quadrant of the split-pixel image data, based on and/or in response to determining that the scene feature represented by the respective out-of-focus pixel is positioned behind the depth of field, determining the first weight that is greater than the second weight, the third weight, and the fourth weight, or based on and/or in response to determining that the scene feature represented by the respective out-of-focus pixel is positioned in front of the depth of field, determining the fourth weight that is greater than the first weight, the second weight, and the third weight.

Determining the first weight, the second weight, the third weight, and the fourth weight may additionally include, for out-of-focus pixels located in a second quadrant of the split-pixel image data, determining whether the scene feature represented by the respective out-of-focus pixel is positioned behind the depth of field or in front of the depth of field. Determining the first weight, the second weight, the third weight, and the fourth weight may further include, for out-of-focus pixels located in the second quadrant of the split-pixel image data, based on and/or in response to determining that the scene feature represented by the respective out-of-focus pixel is positioned behind the depth of field, determining the second weight that is greater than the first weight, the third weight, and the fourth weight, or based on and/or in response to determining that the scene feature represented by the respective out-of-focus pixel is positioned in front of the depth of field, determining the third weight that is greater than the first weight, the second weight, and the fourth weight.

Determining the first weight, the second weight, the third weight, and the fourth weight may additionally include, for out-of-focus pixels located in a third quadrant of the split-pixel image data, determining whether the scene feature represented by the respective out-of-focus pixel is positioned behind the depth of field or in front of the depth of field. Determining the first weight, the second weight, the third weight, and the fourth weight may further include, for out-of-focus pixels located in the third quadrant of the split-pixel image data, based on and/or in response to determining that the scene feature represented by the respective out-of-focus pixel is positioned behind the depth of field, determining the third weight that is greater than the first weight, the second weight, and the fourth weight, or based on and/or in response to determining that the scene feature represented by the respective out-of-focus pixel is positioned in front of the depth of field, determining the second weight that is greater than the first weight, the third weight, and the fourth weight.

Determining the first weight, the second weight, the third weight, and the fourth weight may additionally include, for out-of-focus pixels located in a fourth quadrant of the split-pixel image data, determining whether the scene feature represented by the respective out-of-focus pixel is positioned behind the depth of field or in front of the depth of field. Determining the first weight, the second weight, the third weight, and the fourth weight may further include, for out-of-focus pixels located in the fourth quadrant of the split-pixel image data, based on and/or in response to determining that the scene feature represented by the respective out-of-focus pixel is positioned behind the depth of field, determining the fourth weight that is greater than the first weight, the second weight, and the third weight, or based on and/or in response to determining that the scene feature represented by the respective out-of-focus pixel is positioned in front of the depth of field, determining the first weight that is greater than the second weight, the third weight, and the fourth weight.

In some embodiments, respective sub-images of the split-pixel image data may have been captured as part of a single exposure by corresponding photosites of the split-pixel camera.

In some embodiments, based on the corresponding position of the scene feature represented by each respective pixel of the plurality of pixels, one or more in-focus pixels of the plurality of pixels may be identified. Scene features represented by the one or more in-focus pixels may be positioned within the depth of field. For each respective in-focus pixel of the one or more in-focus pixels, a corresponding pixel value may be determined by adding the first value of the corresponding first pixel in the first sub-image and the second value of the corresponding second pixel in the second sub-image. The enhanced image may be generated further based on the corresponding pixel value determined for each respective in-focus pixel.

In some embodiments, determining the corresponding position of the scene feature represented by the respective pixel relative to the depth of field of the split-pixel camera may include determining, for each respective pixel of the plurality of pixels of the split-pixel image data, a difference between the corresponding first pixel in the first sub-image and the corresponding second pixel in the second sub-image, and determining, for each respective pixel of the plurality of pixels of the split-pixel image data, the corresponding position based on the difference.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable medium may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining split-pixel image data captured by a split-pixel camera, wherein the split-pixel image data comprises a first sub-image and a second sub-image;
    determining, for each respective pixel of a plurality of pixels of the split-pixel image data, a corresponding position of a scene feature represented by the respective pixel relative to a depth of field of the split-pixel camera;
    identifying, based on the corresponding position of the scene feature represented by each respective pixel of the plurality of pixels, one or more out-of-focus pixels of the plurality of pixels, wherein scene features represented by the one or more out-of-focus pixels are positioned outside of the depth of field;
    determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image; and
    generating, based on the corresponding pixel value determined for each respective out-of-focus pixel, an enhanced image having an extended depth of field.

2. The computer-implemented method of claim 1, wherein determining the corresponding pixel value comprises:
    selecting, for each respective out-of-focus pixel, one of: the corresponding first pixel or the corresponding second pixel, as a source pixel for the respective out-of-focus pixel based on (i) the corresponding position of the scene feature represented by the respective out-of-focus pixel relative to the depth of field and (ii) the location of the respective out-of-focus pixel within the split-pixel image data; and determining, for each respective out-of-focus pixel, the corresponding pixel value based on a value of the source pixel.

3. The computer-implemented method of claim 2, wherein:
for out-of-focus pixels located in a first half of the split-pixel image data:
(i) the corresponding first pixel is selected as the source pixel when the scene feature represented by the respective out-of-focus pixel is positioned behind the depth of field; and
(ii) the corresponding second pixel is selected as the source pixel when the scene feature represented by the respective out-of-focus pixel is positioned in front of the depth of field; and
for out-of-focus pixels located in a second half of the split-pixel image data:
(i) the corresponding second pixel is selected as the source pixel when the scene feature represented by the respective out-of-focus pixel is positioned behind the depth of field; and
(ii) the corresponding first pixel is selected as the source pixel when the scene feature represented by the respective out-of-focus pixel is positioned in front of the depth of field.

4. The computer-implemented method of claim 1, wherein determining the corresponding pixel value comprises:
determining, for each respective out-of-focus pixel, a first weight for the corresponding first pixel and a second weight for the corresponding second pixel based on (i) the corresponding position of the scene feature represented by the respective out-of-focus pixel relative to the depth of field and (ii) the location of the respective out-of-focus pixel within the split-pixel image data; and
determining, for each respective out-of-focus pixel, the corresponding pixel value based on (i) a first product of the first weight and the first value of the corresponding first pixel and (ii) a second product of the second weight and the second value of the corresponding second pixel.

5. The computer-implemented method of claim 4, wherein:
for out-of-focus pixels located in a first half of the split-pixel image data:
(i) the first weight for the corresponding first pixel is greater than the second weight for the corresponding second pixel when the scene feature represented by the respective out-of-focus pixel is positioned behind the depth of field; and
(ii) the second weight for the corresponding second pixel is greater than the first weight for the corresponding first pixel when the scene feature represented by the respective out-of-focus pixel is positioned in front of the depth of field; and
for out-of-focus pixels located in a second half of the split-pixel image data:
(i) the second weight for the corresponding second pixel is greater than the first weight for the corresponding first pixel when the scene feature represented by the respective out-of-focus pixel is positioned behind the depth of field; and
(ii) the first weight for the corresponding first pixel is greater than the second weight for the corresponding second pixel when the scene feature represented by the respective out-of-focus pixel is positioned in front of the depth of field.

6. The computer-implemented method of claim 4, wherein determining the first weight and the second weight comprises:
determining, for each respective spatial frequency of a plurality of spatial frequencies present within the split-pixel image data, (i) a first magnitude of the respective spatial frequency within the first sub-image and (ii) a second magnitude of the respective spatial frequency within the second sub-image;
determining, for each respective spatial frequency, a difference between the first magnitude and the second magnitude;
determining, for each respective spatial frequency, the first weight for the first magnitude and the second weight for the second magnitude, wherein:
for each respective spatial frequency above a threshold frequency and associated with a difference that exceeds a threshold value, the first weight differs from the second weight, and the first weight and the second weight are based on the corresponding position of the scene feature represented by the respective out-of-focus pixel relative to the depth of field,
for each respective spatial frequency (i) below the threshold frequency or (ii) above the threshold frequency and associated with a difference that does not exceed the threshold value, the first weight is equal to the second weight; and
determining, for each respective out-of-focus pixel, the corresponding pixel value based on a sum of (i) a first plurality of products of the first weight and the first magnitude for each respective spatial frequency represented by the first value of the corresponding first pixel and (ii) a second plurality of products of the second weight and the second magnitude for each respective spatial frequency represented by the second value of the corresponding second pixel.

7. The computer-implemented method of claim 1, wherein the split-pixel image data comprises the first sub-image, the second sub-image, a third sub-image, and a fourth sub-image, and wherein determining the corresponding pixel value comprises:
selecting, for each respective out-of-focus pixel, one of: the corresponding first pixel in the first sub-image, the corresponding second pixel in the second sub-image, a corresponding third pixel in the third sub-image, or a corresponding fourth pixel in the fourth sub-image, as a source pixel for the respective out-of-focus pixel based on (i) the corresponding position of the scene feature represented by the respective out-of-focus pixel relative to the depth of field and (ii) the location of the respective out-of-focus pixel within the split-pixel image data; and
determining, for each respective out-of-focus pixel, the corresponding pixel value based on a value of the source pixel.

8. The computer-implemented method of claim 7, wherein:
for out-of-focus pixels located in a first quadrant of the split-pixel image data:
(i) the corresponding first pixel is selected as the source pixel when the scene feature represented by the respective out-of-focus pixel is positioned behind the depth of field; and
(ii) the corresponding fourth pixel is selected as the source pixel when the scene feature represented by the respective out-of-focus pixel is positioned in front of the depth of field;

for out-of-focus pixels located in a second quadrant of the split-pixel image data:
  (i) the corresponding second pixel is selected as the source pixel when the scene feature represented by the respective out-of-focus pixel is positioned behind the depth of field; and
  (ii) the corresponding third pixel is selected as the source pixel when the scene feature represented by the respective out-of-focus pixel is positioned in front of the depth of field;
for out-of-focus pixels located in a third quadrant of the split-pixel image data:
  (i) the corresponding third pixel is selected as the source pixel when the scene feature represented by the respective out-of-focus pixel is positioned behind the depth of field; and
  (ii) the corresponding second pixel is selected as the source pixel when the scene feature represented by the respective out-of-focus pixel is positioned in front of the depth of field; and
for out-of-focus pixels located in a fourth quadrant of the split-pixel image data:
  (i) the corresponding fourth pixel is selected as the source pixel when the scene feature represented by the respective out-of-focus pixel is positioned behind the depth of field; and
  (ii) the corresponding first pixel is selected as the source pixel when the scene feature represented by the respective out-of-focus pixel is positioned in front of the depth of field.

9. The computer-implemented method of claim 1, wherein the split-pixel image data comprises the first sub-image, the second sub-image, a third sub-image, and a fourth sub-image, and wherein determining the corresponding pixel value comprises:
  determining, for each respective out-of-focus pixel, a first weight for the corresponding first pixel, a second weight for the corresponding second pixel, a third weight for a corresponding third pixel in the third sub-image, and a fourth weight for a corresponding fourth pixel in the fourth sub-image based on (i) the corresponding position of the scene feature represented by the respective out-of-focus pixel relative to the depth of field and (ii) the location of the respective out-of-focus pixel within the split-pixel image data; and
  determining, for each respective out-of-focus pixel, the corresponding pixel value based on (i) a first product of the first weight and the first value of the corresponding first pixel, (ii) a second product of the second weight and the second value of the corresponding second pixel,
  (iii) a third product of the third weight and a third value of the corresponding third pixel, and (ii) a fourth product of the fourth weight and a fourth value of the corresponding fourth pixel.

10. The computer-implemented method of claim 9, wherein:
for out-of-focus pixels located in a first quadrant of the split-pixel image data:
  (i) the first weight for the corresponding first pixel is greater than the second weight for the corresponding second pixel, the third weight for the corresponding third pixel, and the fourth weight for the corresponding fourth pixel when the scene feature represented by the respective out-of-focus pixel is positioned behind the depth of field; and
  (ii) the fourth weight for the corresponding fourth pixel is greater than the first weight for the corresponding first pixel, the second weight for the corresponding second pixel, and the third weight for the corresponding third pixel when the scene feature represented by the respective out-of-focus pixel is positioned in front of the depth of field;
for out-of-focus pixels located in a second quadrant of the split-pixel image data:
  (i) the second weight for the corresponding second pixel is greater than the first weight for the corresponding first pixel, the third weight for the corresponding third pixel, and the fourth weight for the corresponding fourth pixel when the scene feature represented by the respective out-of-focus pixel is positioned behind the depth of field; and
  (ii) the third weight for the corresponding third pixel is greater than the first weight for the corresponding first pixel, the second weight for the corresponding second pixel, and the fourth weight for the corresponding fourth pixel when the scene feature represented by the respective out-of-focus pixel is positioned in front of the depth of field;
for out-of-focus pixels located in a third quadrant of the split-pixel image data:
  (i) the third weight for the corresponding third pixel is greater than the first weight for the corresponding first pixel, the second weight for the corresponding second pixel, and the fourth weight for the corresponding fourth pixel when the scene feature represented by the respective out-of-focus pixel is positioned behind the depth of field; and
  (ii) the second weight for the corresponding second pixel is greater than the first weight for the corresponding first pixel, the third weight for the corresponding third pixel, and the fourth weight for the corresponding fourth pixel when the scene feature represented by the respective out-of-focus pixel is positioned in front of the depth of field; and
for out-of-focus pixels located in a fourth quadrant of the split-pixel image data:
  (i) the fourth weight for the corresponding fourth pixel is greater than the first weight for the corresponding first pixel, the second weight for the corresponding second pixel, and the third weight for the corresponding third pixel when the scene feature represented by the respective out-of-focus pixel is positioned behind the depth of field; and
  (ii) the first weight for the corresponding first pixel is greater than the second weight for the corresponding second pixel, the third weight for the corresponding third pixel, and the fourth weight for the corresponding fourth pixel when the scene feature represented by the respective out-of-focus pixel is positioned in front of the depth of field.

11. The computer-implemented method of claim 1, wherein respective sub-images of the split-pixel image data were captured as part of a single exposure by corresponding photosites of the split-pixel camera.

12. The computer-implemented method of claim 1, further comprising:
  identifying, based on the corresponding position of the scene feature represented by each respective pixel of the plurality of pixels, one or more in-focus pixels of the plurality of pixels, wherein scene features represented by the one or more in-focus pixels are positioned within the depth of field; and determining, for each respective in-focus pixel of the one or more in-focus pixels, a corresponding pixel value by adding the first value of the corresponding first pixel in the first sub-image and the second value of the corresponding second pixel in the second sub-image, wherein the enhanced image is generated further based on the corresponding pixel value determined for each respective in-focus pixel.

13. The computer-implemented method of claim 1, wherein determining the corresponding position of the scene feature represented by the respective pixel relative to the depth of field of the split-pixel camera comprises:
  determining, for each respective pixel of the plurality of pixels of the split-pixel image data, a difference between the corresponding first pixel in the first sub-image and the corresponding second pixel in the second sub-image; and
  determining, for each respective pixel of the plurality of pixels of the split-pixel image data, the corresponding position based on the difference.

14. A system comprising:
  a processor; and
  a non-transitory computer-readable medium having stored thereon instructions that, when executed by the processor, cause the processor to perform operations comprising:
    obtaining split-pixel image data captured by a split-pixel camera, wherein the split-pixel image data comprises a first sub-image and a second sub-image;
    determining, for each respective pixel of a plurality of pixels of the split-pixel image data, a corresponding position of a scene feature represented by the respective pixel relative to a depth of field of the split-pixel camera;
    identifying, based on the corresponding position of the scene feature represented by each respective pixel of the plurality of pixels, one or more out-of-focus pixels of the plurality of pixels, wherein scene features represented by the one or more out-of-focus pixels are positioned outside of the depth of field;
    determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image; and
    generating, based on the corresponding pixel value determined for each respective out-of-focus pixel, an enhanced image having an extended depth of field.

15. A non-transitory computer-readable medium having stored thereon instructions that, when executed by a computing device, cause the computing device to perform operations comprising:
  obtaining split-pixel image data captured by a split-pixel camera, wherein the split-pixel image data comprises a first sub-image and a second sub-image;
  determining, for each respective pixel of a plurality of pixels of the split-pixel image data, a corresponding position of a scene feature represented by the respective pixel relative to a depth of field of the split-pixel camera;
  identifying, based on the corresponding position of the scene feature represented by each respective pixel of the plurality of pixels, one or more out-of-focus pixels of the plurality of pixels, wherein scene features represented by the one or more out-of-focus pixels are positioned outside of the depth of field;
  determining, for each respective out-of-focus pixel of the one or more out-of-focus pixels, a corresponding pixel value based on (i) the corresponding position of the scene feature represented by the respective out-of-focus pixel relative to the depth of field, (ii) a location of the respective out-of-focus pixel within the split-pixel image data, and (iii) at least one of: a first value of a corresponding first pixel in the first sub-image or a second value of a corresponding second pixel in the second sub-image; and
  generating, based on the corresponding pixel value determined for each respective out-of-focus pixel, an enhanced image having an extended depth of field.

16. The system of claim 14, wherein the operations further comprise:
  selecting, for each respective out-of-focus pixel, one of: the corresponding first pixel or the corresponding second pixel, as a source pixel for the respective out-of-focus pixel based on (i) the corresponding position of the scene feature represented by the respective out-of-focus pixel relative to the depth of field and (ii) the location of the respective out-of-focus pixel within the split-pixel image data; and
  determining, for each respective out-of-focus pixel, the corresponding pixel value based on a value of the source pixel.

17. The system of claim 14, wherein the operations further comprise:
  determining, for each respective out-of-focus pixel, a first weight for the corresponding first pixel and a second weight for the corresponding second pixel based on (i) the corresponding position of the scene feature represented by the respective out-of-focus pixel relative to the depth of field and (ii) the location of the respective out-of-focus pixel within the split-pixel image data; and
  determining, for each respective out-of-focus pixel, the corresponding pixel value based on (i) a first product of the first weight and the first value of the corresponding first pixel and (ii) a second product of the second weight and the second value of the corresponding second pixel.

18. The system of claim 17, wherein determining the first weight and the second weight comprises:
  determining, for each respective spatial frequency of a plurality of spatial frequencies present within the split-pixel image data, (i) a first magnitude of the respective spatial frequency within the first sub-image and (ii) a second magnitude of the respective spatial frequency within the second sub-image;
  determining, for each respective spatial frequency, a difference between the first magnitude and the second magnitude;
  determining, for each respective spatial frequency, the first weight for the first magnitude and the second weight for the second magnitude, wherein:
    for each respective spatial frequency above a threshold frequency and associated with a difference that exceeds a threshold value, the first weight differs from the second weight, and the first weight and the second weight are based on the corresponding position of the scene feature represented by the respective out-of-focus pixel relative to the depth of field, for each respective spatial frequency (i) below the threshold frequency or (ii) above the threshold frequency and associated with a difference that does not exceed the threshold value, the first weight is equal to the second weight; and determining, for each respective out-of-focus pixel, the corresponding pixel value based on a sum of (i) a first plurality of products of the first weight and the first magnitude for each respective spatial frequency represented by the first value of the corresponding first pixel and (ii) a second plurality of products of the second weight and the second magnitude for each respective spatial frequency represented by the second value of the corresponding second pixel.

19. The system of claim 14, wherein the split-pixel image data comprises the first sub-image, the second sub-image, a third sub-image, and a fourth sub-image, and wherein determining the corresponding pixel value comprises:

selecting, for each respective out-of-focus pixel, one of: the corresponding first pixel in the first sub-image, the corresponding second pixel in the second sub-image, a corresponding third pixel in the third sub-image, or a corresponding fourth pixel in the fourth sub-image, as a source pixel for the respective out-of-focus pixel based on (i) the corresponding position of the scene feature represented by the respective out-of-focus pixel relative to the depth of field and (ii) the location of the respective out-of-focus pixel within the split-pixel image data; and determining, for each respective out-of-focus pixel, the corresponding pixel value based on a value of the source pixel.

20. The system of claim 14, wherein the split-pixel image data comprises the first sub-image, the second sub-image, a third sub-image, and a fourth sub-image, and wherein determining the corresponding pixel value comprises:

determining, for each respective out-of-focus pixel, a first weight for the corresponding first pixel, a second weight for the corresponding second pixel, a third weight for a corresponding third pixel in the third sub-image, and a fourth weight for a corresponding fourth pixel in the fourth sub-image based on (i) the corresponding position of the scene feature represented by the respective out-of-focus pixel relative to the depth of field and (ii) the location of the respective out-of-focus pixel within the split-pixel image data; and determining, for each respective out-of-focus pixel, the corresponding pixel value based on (i) a first product of the first weight and the first value of the corresponding first pixel, (ii) a second product of the second weight and the second value of the corresponding second pixel, (iii) a third product of the third weight and a third value of the corresponding third pixel, and (ii) a fourth product of the fourth weight and a fourth value of the corresponding fourth pixel.

* * * * *